United States Patent
Higuchi et al.

(10) Patent No.: US 6,224,223 B1
(45) Date of Patent: May 1, 2001

(54) ILLUMINATION PANEL AND DISPLAY DEVICE USING THE SAME

(75) Inventors: Masaru Higuchi, Hachioji; Minoru Fujiwara, Tokyo; Tetsuo Muto, Hachioji; Yasuhiro Daiku, Iruma, all of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/215,008

(22) Filed: Dec. 17, 1998

(30) Foreign Application Priority Data

Dec. 22, 1997 (JP) .................................. 9-353603
Apr. 6, 1998 (JP) ................................. 10-093134
Jul. 22, 1998 (JP) ................................. 10-206418

(51) Int. Cl.[7] ........................................ F21V 8/00
(52) U.S. Cl. ................................. 362/31; 362/561
(58) Field of Search ......................... 362/31, 26, 561

(56) References Cited

U.S. PATENT DOCUMENTS

| 5,126,882 | 6/1992 | Oe et al. ................... 359/619 |
| 5,165,772 | * 11/1992 | Wu ............................ 362/31 X |
| 5,420,761 | * 5/1995 | DuNah et al. ................ 362/31 |
| 5,719,649 | 2/1998 | Shono et al. ................. 349/65 |
| 5,914,760 | * 6/1999 | Daiku ....................... 362/31 X |

FOREIGN PATENT DOCUMENTS

| 0 167 721 A1 | 1/1986 | (EP) . |
| 0 802 446 A1 | 10/1997 | (EP) . |
| 61-158367 | 7/1986 | (JP) . |
| 08-054517 | 2/1996 | (JP) . |
| WO 95/17699 | 6/1995 | (WO) . |

* cited by examiner

Primary Examiner—Laura K. Tso
(74) Attorney, Agent, or Firm—Frishauf, Holtz, Goodman, Langer & Chick, P.C.

(57) ABSTRACT

An illumination panel comprises a light source, a photoconductor for guiding light from the light source, and an optical film for emitting light emitted from the photoconductor ahead of an observer. The photoconductor comprises a stepwise face having an incident end face onto which the light from the light source is projected, step faces, and step differentiating faces for emitting the light guided from the light source and connecting the step faces, and reflective films formed on the step faces. The optical film is arranged at the front side of the photoconductor, and has projected incident portions which are opposite to the step differentiating faces in a light emitting direction. The optical film emits the light emitted from the step differentiating faces ahead, and causes the light that is projected from the front to be reflected ahead on reflective faces on the step faces. In the incident portions, one of side faces opposite to the step differentiating faces of the photoconductor makes an incident face for receiving the light emitted from the step differentiating faces, and the other makes a refractive face for reflecting/refracting the light taken in the incident face toward its front face. A liquid crystal display element is arranged at the front of this illumination panel so that they constitute a liquid crystal display device.

51 Claims, 12 Drawing Sheets

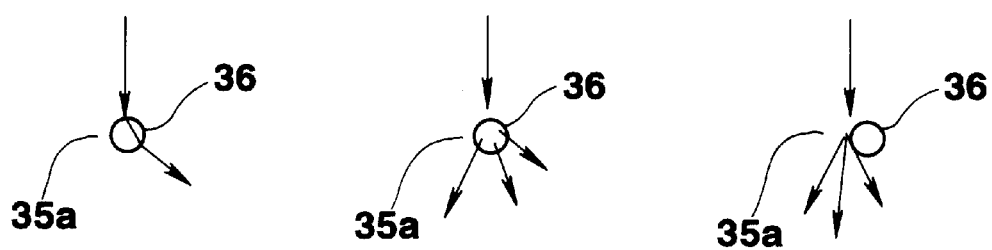
FIG.14A  FIG.14B  FIG.14C
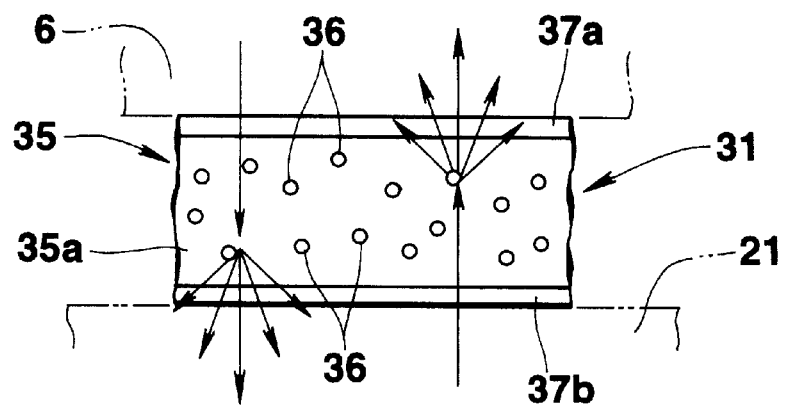
FIG.15
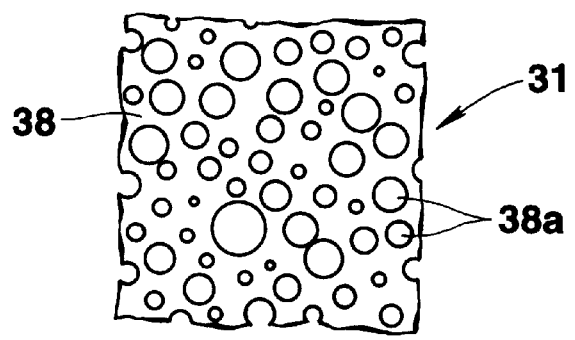
FIG.16

ILLUMINATION PANEL AND DISPLAY DEVICE USING THE SAME

BACKGROUND OF THE INVENTION

This invention relates to an illumination panel of a sidelight type, and a display device using the same.

Hitherto, as an illumination panel which emits light from its front face, there has been a panel called a sidelight type.

Hitherto, the illumination panel of this sidelight type has been composed of: a photoconductor whose at least one end face is an incident face of for light from a light source and whose front face is an emitting face of the light taken in from the end face; and a light source section arranged oppositely to the end face of the photoconductor.

As this photoconductor, there is generally used a transparent plate in a flat plate form comprising acrylic resin or the like. As the light source section, there is used a fluorescent lamp in a straight tube form, an LED array wherein plural LEDs (Light Emitting Diodes) are arranged, or the like.

In this illumination panel, light from the light source section is introduced into the photoconductor, and the light is emitted from the substantially whole area of its front face. The light from the light source section is taken in the photoconductor from its single end face, and is repeatedly reflected in this photoconductor. Thereafter, the light is emitted from the front face.

The illumination panel is used for a backlight in a display device using a transmission type display means wherein the transmission of light is controlled for display, such as a liquid crystal display element, or the like. For example, a liquid crystal device using a liquid crystal element has a structure in which the illumination panel is arranged at the back of the liquid crystal display element and oppositely to the element.

Display devices having this illumination panel are classified into devices in which only display using light from the illumination panel is carried out and devices in which both display using light from the illumination panel and display using outer light such as natural light or room light are carried out, that is, what is called two way display type devices. Conventional two way display devices have a structure in which a semi-transmission reflective plate is arranged between the display means and the illumination panel arranged behind the means.

In this two way display device, when sufficient outer light is obtained, reflection type display using the outer light is carried out, and when sufficient outer light is not obtained, the light source section of the illumination panel is switched on to carry out transmission type display using the light from this illumination panel. In the case of the reflection type display using outer light, the outer light incident from the front side of the display means is reflected on the semi-transmission reflective plate and then the light is transmitted through the display means again to be emitted outwards, whereby display is carried out. In the case of the transmission display using light from the illumination panel, the light transmitted through the semi-transmission reflective plate, among light source light from the illumination panel, becomes light incident on the display means, and then the light is transmitted through the display means to be emitted outwards, whereby display is carried out.

The aforementioned conventional display devices have a problem that bright display cannot be obtained whether outer light is used or light from the illumination panel is used.

This is because the conventional illumination panel does not have a function of reflecting outer light to be emitted ahead of the display means and thus the semi-transmission reflective plate is essential to make any display device into a two way display type.

In other words, the semi-transmission reflective plate causes the incident light to be reflected or transmitted dependently on its reflectivity/transmissivity characteristics, and therefore in the case of the reflection type display using outer light, the light of a quantity corresponding to the transmissivity of the semi-transmission reflective plate, among the incident outer light, becomes loss light that is transmitted through the semi-transmission reflective plate and is not reflected. On the other hand, in the case of the transmission type display using light from the illumination panel, the light of a quantity corresponding to the reflectivity of the semi-transmission reflective plate, among the light source light emitted from the illumination panel, becomes loss light that is reflected on the semi-transmission reflective plate and is not transmitted.

For this reason, in the conventional two way display devices, the efficiency of using light is low in both the case where outer light is used and the case where light from the illumination panel is used. And the convention display gets dark in either case of the display using outer light or the display using light from the illumination panel.

BRIEF SUMMARY OF THE INVENTION

An object of this invention is to provide an illumination panel in which in a bright environment outer light is used as illumination light and in a dark environment a light source is switched on, so that the light is used as illumination light; and a display device using the illumination panel.

In order to attain the aforementioned object, an illumination panel according to the invention comprises:

a light source; and a photoconductor including an incident end face for taking in light from the light source, and a front face having emitting faces which are arranged at intervals and oppositely to the incident end face, and guide the light incident from the incident end face and then emit illumination light directly toward a given direction and reflective faces each of which is arranged between the adjacent emitting faces and reflect outer light incident toward the front, and an optical film for emitting the light emitted from the emitting faces of the photoconductor ahead and emitting the light that is projected from the front and then reflected on the reflective faces of the photoconductor, ahead.

In such an illumination panel, when intensity of outer light is large in a bright environment, light resulting from reflection of the outer light incident from the front of the illumination panel on the reflective films of the photoconductor can be used as illumination light. When outer light cannot be used as illumination light in a dark environment, the light source opposite to the incident end face of the photoconductor is switched on to emit light from the emitting face of the photoconductor. The light is projected into the optical film and then refracted and reflected on the optical film to emit the light ahead of the illumination panel. The light can be used as illumination light. Furthermore, the photoconductor has an emitting face which is opposite to the incident end face onto which the light from the light source is projected, the incident light being directly emitted from the emitting face. For this reason, direct light from the incident end face can be emitted ahead so as to obtain intense emitted light.

The front face of the photoconductor may comprise a face which is made into a stepwise shape by step faces on which the reflective faces are formed so as to constitute the reflective faces, and step differentiating faces for connecting these step faces adjacent to each other and emitting the light incident from the incident end face, these step differentiating faces constituting the emitting faces.

According to such a face structure of the photoconductor, almost all of the outer light incident from the front of the illumination panel is received on the reflective films deposited on the step faces, reflected and again emitted ahead of the illumination panel.

Furthermore, the optical film may comprise a flat front face for emitting light ahead, and a back face having one or more incident portions which are projections and have an incident face for taking in the light emitted from the step differentiating faces of the photoconductor and a refractive face for reflecting or refracting the light that is taken in from the incident face ahead.

According to use of such an optical film, it is possible to take in the light emitted from the emitting face of the photoconductor from its back face and emit mL the light in the direction perpendicular to the front face, and further to emit the outer light incident from the front face from the back face, reflect the light on the reflective films of the photoconductor, again take the light into the optical film from the back face and emit the light in the direction perpendicular to the front face of the optical film.

The incident face of the optical film may be arranged so as to be inclined at an angle of 5 to 15 degrees to the normal of the front face, and the refractive face may be arranged so as to be inclined at an angle of 20 to 50 degrees to the normal of the front face.

The refractive face of the optical film may be a light-concentrating refractive face in a curved form.

The incident portions of the optical film may be arranged at intervals through other face having an inclination different from the inclinations of the incident face and the refractive face, and the other face between the adjacent incident portions may constitute an incident/emitting face which emits the light incident in the optical film from the front face toward the step face of the photoconductor and onto which the light reflected on the reflective faces of the step faces of the photoconductor is projected.

According to the formation of this incident/emitting face, the light incident on the front face of the optical film from the direction perpendicular to the film can be transmitted through the incident/emitting face, reflected on the reflective films formed on the step faces of the photoconductor, and again projected into the optical film from the incident/emitting face so as to emit the light from its front face.

A In the illumination panel of this first aspect, the step faces of the photoconductor and the incident portions of the optical film may be arranged at pitches different from each other.

It is possible to prevent moire fringes, wherein unevenness of light intensity arises by the pitches of the step faces and the incident portions, by arranging the step faces of the photoconductor and the incident portions of the optical film at pitches different from each other in this way.

A reflective means in a plane plate form may be disposed at the back of the photoconductor.

By the reflective means in a plane form disposed at the back of the photoconductor, partial light of the light incident from the incident end face of the photoconductor can be reflected and then the light can be emitted from the emitting face positioned on the front face.

The front face of the photoconductor of the illumination panel of the first aspect may be made into a stepwise shape face comprising step differentiating faces which have a constant pitch and substantially the same height, and step faces which are respectively positioned between the adjacent differentiating faces.

The photoconductor may have a flat back face, the step faces are parallel to each other, and the step differentiating faces are parallel to each other.

The step faces may be substantially parallel to the back face of the photoconductor, and the step differentiating faces may be substantially perpendicular to the back face of the photoconductor or be inclined an a given angle to the normal of the back face of the photoconductor.

The step faces may be inclined at angles to the back face of the photoconductor in such a manner that the distance between the step faces and the back face becomes longer from base ends of the step faces to front ends thereof, and the step differentiating faces may be substantially perpendicular to the back face of the photoconductor or be inclined an a given angle to the normal of the back face of the photoconductor.

A photoconductor according to the invention comprises:
an incident end face for taking in light from a light source, and
a front face having emitting faces which are arranged at intervals and oppositely to the incident end face and guide the light incident from the incident end face and then emit illumination light directly toward a given direction and reflective faces each of which is arranged between the adjacent emitting faces and reflect outer light incident toward the front.

Since the front face of the photoconductor of the second aspect comprises the emitting faces for emitting light source light and the reflective films for reflecting outer light, it is possible to emit the light source light incident on the incident end face of the photoconductor and reflect the outer light incident on the front face.

Furthermore, the front face of the photoconductor may comprise a face which is made into a stepwise shape by step faces on which the reflective faces are formed so as to constitute the reflective faces, and step differentiating faces for connecting these step faces adjacent to each other and emitting the light incident from the incident end face, these step differentiating faces constituting the emitting faces.

Furthermore, the photoconductor may comprise a photoconductor body, in a stepwise shape, which is constituted by step faces and step differentiating faces for connecting the adjacent step faces to each other and emitting the light incident from the incident end face; and reflective films formed on the respective step faces, the reflective faces being composed of the step faces and the reflective films.

The photoconductor may comprise an undercoat film having a high adhesion to both of the photoconductor body and the reflective films on the step faces. The reflective films may be formed on the undercoat film. Therefore, the adhesion between the photoconductor body and the reflective films becomes good.

The photoconductor may further comprise a transparent overcoat film disposed on the reflective films, so that it is possible to prevent oxidization and the damage of the reflective films.

A display device according to the invention comprises:
a light source; and
a photoconductor comprising an incident end face for taking in light from the light source, and a front face having emitting faces which are arranged at intervals and oppositely to the incident end face and guide the light incident from the incident end face and then emit illumination light directly toward a given direction and reflective faces each of which is arranged between the adjacent emitting faces and reflects outer light incident toward the front.

an optical film which comprise a front face and a back face and is for emitting the light emitted from the emitting face of the photoconductor from the front face and emitting the light that is projected onto the as front face and then reflected on the reflective faces of the photoconductor from the front face, and a transmission type display means for controlling transmission of light, which is arranged at the front side of the optical film.

The display device of this aspect makes it possible to emit the outer light incident on the transmission type display means at its front face from its back face and reflect the light on the reflective films of the photoconductor to be used as illumination light, and further emit the light incident from the incident end face of the photoconductor from the emitting face, project the light onto the back face of the optical film and emit the light from the front face ahead to be used as illumination light. Thus, the device can be used as a display device wherein any light source is unnecessary in a bright environment, and used as a display device using the light source in a dark environment.

The front face of the photoconductor may comprises a face which is made into a stepwise shape by step faces on which the reflective faces are formed so as to constitute the reflective faces, and step differentiating faces for connecting these step faces adjacent to each other and emitting the light incident from the incident end face, these step differentiating faces constituting the emitting faces.

Accordingly, the outer light incident on the front face of the transmission display type display means can be projected onto the step faces of the photoconductor, reflected on the reflective films deposited on the step faces and again transmitted through the transmission type display means to be emitted from the front face. In addition, the light from the light source can be projected from the incident end face and then emitted from the step differentiating faces so as to be used as illumination light from the back face of the transmission type display means.

The back face of the optical film may comprise incident portions, in a projection form, having an incident face for taking in the light emitted from the step differentiating faces of the photoconductor and a refractive face for refracting the light taken in from the incident face ahead.

The angle between the incident face of the incident portions and the normal of the front face of the optical film may be within the range from 5 to 15 degrees, and the angle between the incident/emitting faces and the normal of the front face of the optical film may be within the range from 70 to 90 degrees.

The refractive face of the incident portions of the optical film maybe an inclination face which is inclined at a given angle to the normal of the front face of the optical film. The angle between the refractive face and the perpendicular line of the front face of the optical film may be within the range from 30 to 50 degrees.

The refractive face of the incident portions of the optical film may be a light-concentrating face which is a curved face, so that the light emitted from the front face of the optical film can be concentrated within the range of small angels and then emitted.

The display device may comprise a light diffusing means between the back face of the display body and the front face of the lighting means and/or at the front of the transmission type display body means.

The light diffusing means makes it possible to scatter the light emitted from the front face of the lighting means and then project the light onto the back face of the transmission type display means. Thus, light can be emitted from the front face of the transmission type display means over a wide angle range.

The transmission type display means or body may a liquid crystal display element having on its outer face a light-polarizing plate, and the light diffusing means may be unitedly fitted onto an outer face of the light-polarzing plate.

The light diffusing means may be unitedly fitted onto the front face of the optical film photoconductor of the lighting means.

The light diffusing means may be respectively arranged at the front of the display body and between the back face of the display body and the front face of the lighting means.

The light diffusing means may be a roughened film wherein at least one face thereof is roughened.

The light diffusing means may be a scattering material incorporated film wherein a scattering material is dispersed into a base material, a porous film, a polycrystallized material film having boundary faces, or light scattering fibers.

In the display device, a pitch of the incident portions of the optical film may be smaller than an arranging pitch of pixel portions of the display means and a pitch of the emitting faces of the photoconductor, and thus it has a structure wherein it is difficult that bright and dark fringes arise by interference of light, or the like.

The arranging pitch of the pixel portions of the display means and the pitch of the emitting faces of the photoconductor may be different from each other, so that the display device becomes a structure wherein it is more difficult that bright and dark fringes arise by interference of light, or the like.

The pitch of the incident portions of the optical film is smaller than the arranging pitch of the pixel portions of the display means, so that at least one incident portions opposite to any one of the pixel portions so that uniform light can be supplied to any pixel portions.

In the display device according to the invention, the length direction of the step differentiating faces of the photoconductor and the length direction of the incident portions of the optical film may be obliquely shifted to each other.

The length direction of the incident portions of the optical film may be obliquely shifted to the arranging direction of the pixel portions of the display means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14A, 14B and 14C are enlarged cross sections, each of which shows the effect of the scattering means shown in FIG. 13.

FIG. 15 is an enlarged cross section of a further different light diffusing means used in the display device according to the third embodiment.

FIG. 16 is an enlarged plane view of a further different light diffusing means used in the display device according to the third embodiment.

DETAILED DESCRIPTION OF THE INVENTION

Liquid crystal display devices will be described below as embodiments of the present invention with reference to the accompanying drawings.

[First Embodiment]

Figure 1:
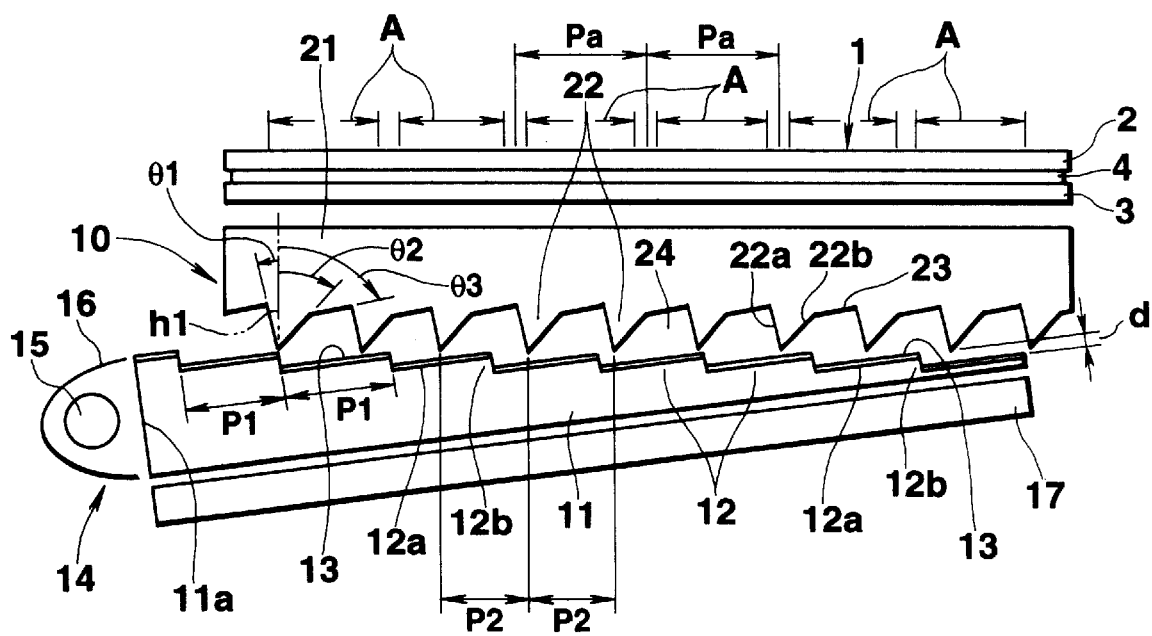
FIG. 1 is a cross section illustrating a display device using an illumination panel according to a first embodiment of this invention.
Figure 2:
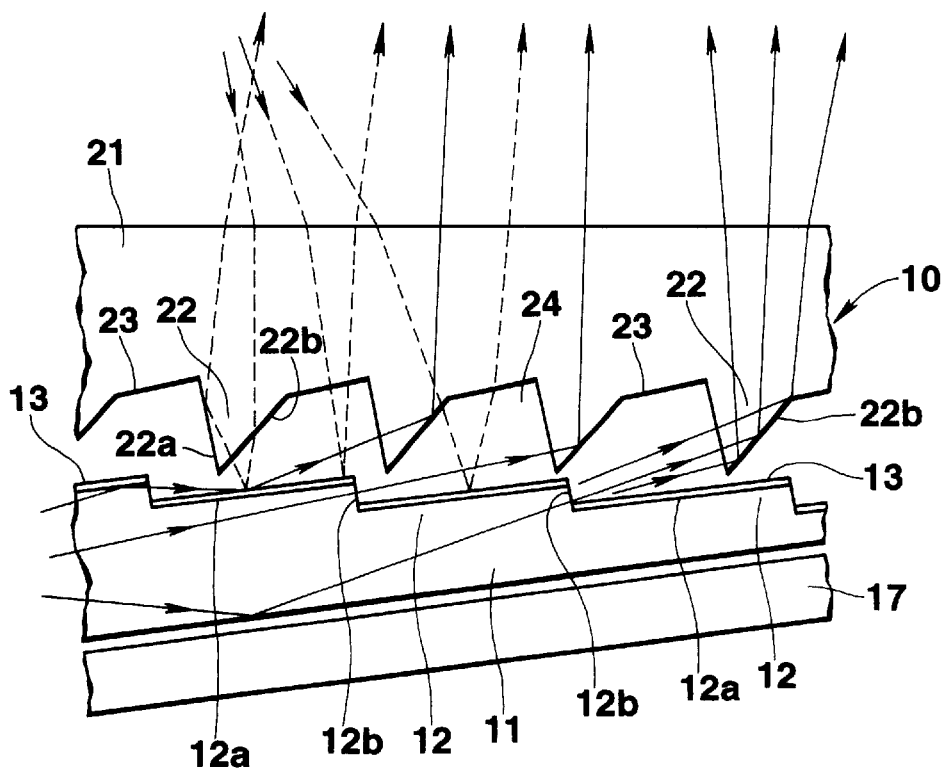
FIG. 2 is an enlarged cross section of FIG. 1, illustrating a part of the illumination panel according to the first embodiment.

FIG. 1 and FIG. 2 illustrate a first embodiment of this invention. FIG. 1 is a cross section of a two way display device having an illumination panel, and FIG. 2 is an enlarged cross section of a part of the illumination panel.

In the display device of this embodiment, a liquid crystal display element is used as a transmission type display means wherein the transmission of light is controlled for display. As shown in FIG. 1, this display device comprises a liquid crystal display element 1, and an illumination panel 10 arranged oppositely to the back face of this liquid crystal display element 1.

The liquid crystal display element 1, the inner structure of which is not illustrated, is an element obtained by bonding a pair of front and back, transparent base plates 2 and 3 through a seal member 4 in a frame form, and then sealing liquid crystal in the area which is surrounded by the seal member 4 and positioned between both the base plates 2 and 3. Transparent electrodes are fitted to the inner faces of both the base plates 2 and 3, in order to apply an electric field to the respective liquid crystal layers.

The liquid crystal display element 1 used in this embodiment is an active matrix liquid crystal display element for displaying color images. The inner face of the one base plate, for example, the back side base plate 3 is equipped with plural pixel electrodes arranged in a matrix form, switching elements respectively connected to these pixel electrodes and composed of plural TFTs (Thin Layer Transistors), gate lines for supplying gate signals to the TFTs on each line, and data lines for supplying data signals to the TFTs on each row. The inner face of the other base plate (front side base plate) 2 is equipped with color filters which have plural colors (for example, red, green and blue) and are alternately arranged correspondingly to each of the pixel electrodes, and opposite electrodes which are opposite to all of the pixel electrodes.

Moreover, this liquid crystal display element 1 is an element of, for example, TN (Twisted Nematic) type and thus, in liquid crystal molecules sealed in the space between the base plates 2 and 3, their oriental directions near the respective bas e plates are regulated by oriental films deposited on the inner faces of the base plates 2 and 3. Thus, the molecules are twist-oriented at a given twist angle between both the base plates 2 and 3. Furthermore, respective light-polarizing plates (not illustrated) are fitted onto the outer faces of both the base plates 2 and 3.

The following will describe the illumination panel 10. As shown in FIG. 1 and FIG. 2, this illumination panel 10 is composed of a photoconductor or light guide 11, a light source section 14 arranged aside from this photoconductor 11, an optical film 21 arranged at the front side of the photoconductor 11, and a mirror face reflective plate 17 in a flat plate form arranged oppositely to the back face of the photoconductor 11.

The photoconductor 11 is a transparent plate made of acrylic resin or the like. Its back face is a flat face opposite to the reflective plate 17. Its single end face is a light taking-in end face 11a for taking in light from the light source section 14. (This end face is referred to as an incident end face, hereinafter).

The front face of this photoconductor 11 is made into a stepwise face 12 having a very small pitch, and comprising plural flat step faces 12a which are in parallel to each other and make the distance from the aforementioned back face narrower along the direction of going away from the incident end face 11a, and step differentiating faces 12b for connecting adjacent step faces 12a to each other. In the plural step faces 12a of this stepwise face 12, reflective films 13 are formed by vapor deposition of a high reflectivity metal, such as aluminum, on the whole face of the step faces 12a. A metal film having a reflective function is not formed on the plural step differentiating faces 12b, which rise from the step faces 12a and are formed to connect the adjacent step faces 12a.

Thus, this photoconductor 11 makes it possible to take in light from the light source section 14 through the incident end face 11a, emit the light from the step differentiating faces 12b of the stepwise face 12, and further reflect the light incident on the respective step faces 12a of the stepwise faces 12 from the outside on the reflective films 13 deposited on the respective step faces 12a.

In the photoconductor 11, the pitch of the plural step differentiating faces 12b of the stepwise face 12 is constant, and the step differentiating of the plural step differentiating faces 12b is substantially equal to each other. Furthermore, the respective step faces 12a between the first step differentiating face 12b nearest to the incident end face 11a and the last step differentiating face 12b nearest to the other end of the photoconductor 11 are formed so as to have the same width (the width in the photoconductor length direction).

In this photoconductor 11, the stepwise face 12 is formed in such a manner that the back face of the photoconductor 11 is substantially parallel to all of the plural step faces 12a and the plural step differentiating faces 12a are substantially perpendicular to the back face of the photoconductor 11.

The reflective films 13 comprising a reflective material having a high reflectivity, for example, a high reflectivity metal such as Al, Ag, Cr, Ni, or Pt are deposited on the step faces 12a of the photoconductor 11 and over the substantially whole of the respective step faces 12a. These reflective films 13 form reflective faces for reflecting light incident from the front.

Figure 3:
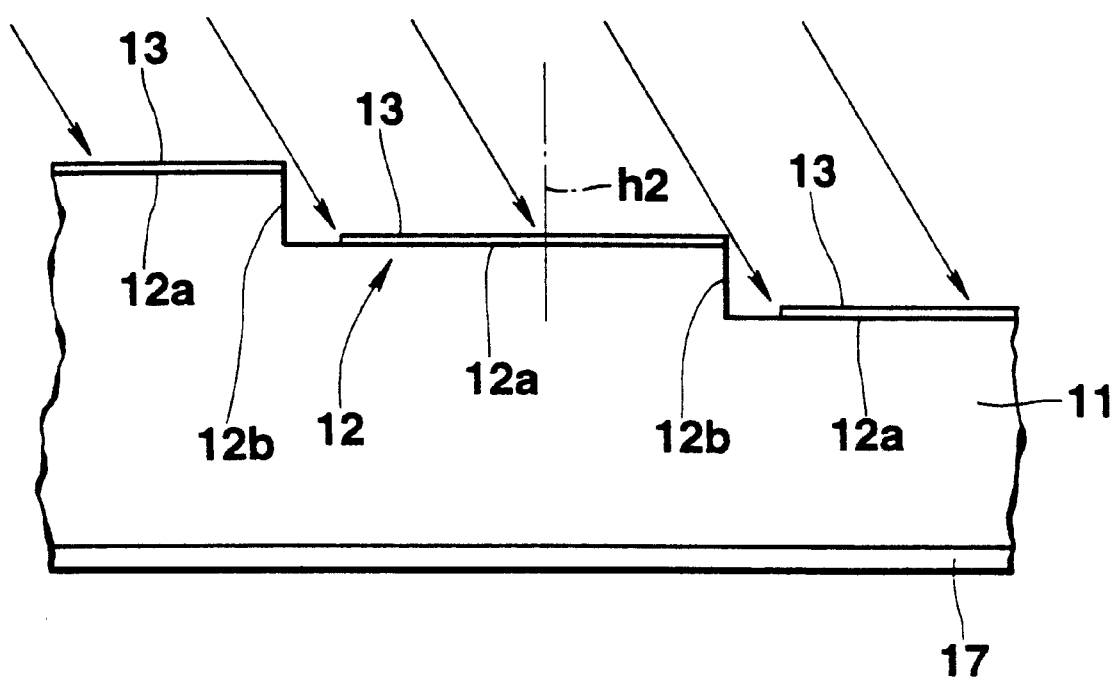
FIG. 3 is an enlarged cross section illustrating a part of a photoconductor used in the illumination panel according to the first embodiment of this invention.

These reflective faces are produced by such a producing method as shown in FIG. 3. This photoconductor 11 is produced by the following method: the mirror face reflective plate (or the reflective film) 17 is formed on the whole back face of the photoconductor 11 having the flat back face, the incident end face 11a and the stepwise face 12, and then films of a reflective material (Al, Ag, Cr, Ni, Pt or the like) are deposited on the step faces 12a of the stepwise face 12, from the direction inclined from the normal h2 of the step faces 12a toward the step differentiating faces 12b at a given angle, by vapor deposition or sputtering. The photoconductor 11 is produced by mold-processing a transparent resin using a mold or cutting-processing a transparent resin plate.

According to this producing process, the reflective material can be made into films on only the plural step faces 12a without covering the step differentiating faces 12b. Thus, the photoconductor 11 can easily be produced at a low cost.

That is, in the case wherein the reflective material is made into films by vapor deposition or sputtering from the direction perpendicular to the step faces 12a of the photoconductor 11 or by plating with the reflective material, the step differentiating faces 12b, which will become light emitting faces, are also coated with the reflective material. Thus, in order to make these step differentiating faces 12b into emitting faces on which the reflective films 13 are not formed, the reflective material is deposited with the step differentiating faces 12b being masked, and then the mask is removed. Alternatively, the reflective material is deposited without any mask, and then the reflective material covering the step differentiating faces 12b must be removed by etching or the like. Therefore, many steps are necessary for the formation of the reflective films 13.

If, as in the producing process in this embodiment, the reflective material is made into films by vapor deposition or sputtering from the direction inclined from the normal h2 of the step faces 12a of the photoconductor 11 toward the incident end face 11a at a given angle, the reflective material does not cover the step differentiating faces 12b but covers only the step faces 12a. Thus, the reflective films 13 can be formed on only the step faces 12a in a single step, whereby the photoconductor 11 can easily be produced at a low cost.

In the case wherein, as in this producing process, the reflective films 13 are deposited by vapor deposition or sputtering from the oblique direction, it is similarly necessary to mask the incident end face 11a of the photoconductor 11, in order that the reflective material does not cover the incident end face 11a. However, the incident end face 11a can easily be masked by, for example, sticking an adhesive tape or the like.

It is desired that the vapor deposition angle of the reflective material is selected within such a range that the reflective material can cover the step faces 12a as wide as possible without covering the step differentiating faces 12b.

The vapor deposition angle is preferably within the range of an inclination angle of 30 to 60 degrees from the normal h2 of the step faces 12a of the photoconductor 11 toward the incident end face 11a. When the reflective material is deposited by vapor deposition or sputtering at an angle within this range, the reflective material can cover the substantially whole of the step faces 12, except very narrow areas around base end portions (boundary portions between the step faces 12a and the step differentiating faces 12b) near the side of the incident end face 11a, without covering the step differentiating faces 12b, so as to form the reflective films 13 having sufficient areas.

If the reflective films 13 are too thin, light is transmitted through them so that a sufficient reflective characteristic cannot be obtained. If they are too thick, the reflective material covers the step differentiating faces 12b. Thus, it is preferred that the thickness is set between the minimum thickness that makes it possible to obtain a sufficient reflective characteristic and the maximum thickness at which the reflective material does not cover the step differentiating faces 12b. Such a thickness is from 100 to 200 nm.

The light source section 14 is composed of, for example, a fluorescent lump 15, in a straight tube form, which has a length over the whole length of the incident end face 11a of the photoconductor 11, and a reflector 16 for reflecting emitted light from the fluorescent lump 15. This light section 14 is arranged at the side of the photoconductor 11 and oppositely to the incident end face 11a.

The incident end face 11a may not be a face perpendicular to the respective step faces 12a that the photoconductor 11 has, and may be a face obtuse to the step faces 12a. When the incident end face 11a is made into a face obtuse to the respective step faces, the light from the fluorescent lump 15 is projected into the photoconductor and then goes with being reflected between its bottom face and the respective step faces, so that uniform lighting can be realized.

On the other hand, the optical film causes the outer light incident from the front of the panel to its front face to be emitted from its back face, and causes the light reflected on the reflective films 13 formed on the respective step faces 12a of the stepwise face 12 of the photoconductor 11 to be taken in from its back face and emitted toward the front of the panel.

This optical film 12 is a transparent film made of an acrylic resin having substantially the same width as that of the photoconductor 11. Its front face is a flat face. Its back face is equipped with plural incident portions 22 which are projected and arranged at a given pitch to receive light emitted from the respective step differentiating faces 12b of the stepwise face 12 of the photoconductor 11.

These incident portions 22 are formed into a form which is long from side to side and has a length over the whole width of the optical film 21, and the optical film 21 is arranged in such a manner that the length direction of the incident portions 22 at the back of the optical film 21 is parallel to the length direction of the step differentiating faces 12b of the photoconductor 11 and the tips of the incident portions 22 approach or contact the step faces 12a of the photoconductor 11.

The respective incident portions 22 of this optical film 21 have a sectional shape that is projected from the lower face of its body. One of side a faces opposite to the step differentiating faces 12b of the photoconductor 11 is an incident face 22a for taking in light emitted from the step differentiating faces 12b, and the other is a refractive face 22b for refracting/reflecting the light taken in from the incident face 22a ahead of the optical film 21 (that is, ahead of the panel).

The incident face 22a is a face which is substantially parallel to each of the step differentiating faces 12b or which has a similar inclination, and is a face having an angle of less than 90 degrees to the each of the step faces 12a. The refractive face 22b is an inclined face wherein its angle to the normal of the front face of the optical film 21 is larger than the angle of the incident face 22a to the normal. More desirably, the angle θ1 of the incident face 22a to the normal h1 of the front face of the optical film is in the range from 5 to 15 degrees. The angle θ2 of the refractive face 22b to the normal h1 of the front face of the optical film is in the range from 20 to 50 degrees.

Therefore, at the back of the optical film 21, grooves are formed in parallel, each of which has two inclined faces having different inclination angles, that is, the incident face 22a and the refractive face 22b.

The respective incident portions 22 are arranged at intervals, and in the areas (in the bottom faces of the grooves) between the respective incident portions 22 behind the optical film 21, incident/emitting faces 23 are formed oppositely to the reflective films 13 formed on the respective step faces 12a of the photoconductor 11. This incident/emitting face 23 is a face which is substantially parallel to each of the step faces 12a or which has a similar inclination. More desirably, the angle θ3 to the normal h1 of the front face of the optical film is within the range from 70 to 90 degrees.

The incident portions 22 are disposed at a pitch different from the pitch of the step differentiating faces 12b of the photoconductor 11. In FIG. 1, for convenience' sake the stepwise face 12 of the photoconductor 11 and the respective incident portions 22 of the optical film 21 are enlarged and illustrated. However, the pitch (P2) of the incident portions 22 of the optical film 21 is substantially the same as the pixel pitch (Pa) of the liquid crystal display element 1 or a value resulting from dividing the pixel pitch by any integer. The pitch (P1) of the step differentiating faces 12b of the photoconductor 11 is a pitch which is somewhat larger than the pitch (P2) of the incident portions 22. Therefore, a pixel portion A corresponds to at least one incident portion 22 of the optical film 21.

It is good that the distance (d) between the reflective film 13 and the tip of the incident portion 22 is as small as possible. It is preferably 5 mm or less, and more preferably 1 mm or less. In this embodiment, the minimum value of the aforementioned distance, that is, the distance between the tip of the incident portion 22 nearest to the front end of the step face 12a and the reflective film 13 is set to about 0 mm (the tip level of the incident portion 22 is substantially equal to the surface level of the reflective film 13) and the maximum value of the aforementioned distance, that is, the distance between the tip of the incident portion 22 nearest to the aforementioned base end of the step face 12a and the reflective film 13 is set to about 0.3 mm.

A low refractive index layer 24 (FIG. 2) which has a refractive index far smaller than the optical film 21 is positioned between the photoconductor 11 and the optical film 21. In this embodiment, the low refractive index layer 24 is an air layer, and the photoconductor 11 and the optical film 21 are bonded to each other in their peripheral portions through a non-illustrated spacer.

In the liquid crystal device of this embodiment, the illumination panel 10 is arranged at the back of the liquid crystal display element 1 so that the side where the light source section 14 is arranged is directed to the direction along which outer light is mainly taken in.

Namely, when outer light is used in a two way display type liquid crystal display device, the device is used in such a manner that its screen is directed so as to take in the outer light mainly from the direction inclined from the normal of the screen toward the upper end side (the direction along which bright outer light can be obtained), in the same manner as normal reflection type liquid crystal display element. In this embodiment, therefore, the illumination panel 10 is arranged so that the side where the light source section 14 is arranged is directed to the upper end side of the screen, which corresponds to the direction along which the outer light is mainly taken in, that is, the upper end side of the liquid crystal display element 1 (the left in FIG. 1).

The aforementioned liquid crystal display device is a two way display type device, wherein when sufficiently bright outer light is obtained, reflection type display using the outer light is carried out and when sufficiently bright outer light is not obtained, the light source section 14 of the illumination panel is switched on and then light from this illumination panel is used to carry out transmission type display. As will be described later, when light from the illumination panel 10 is used, the light from the illumination panel 10 is projected into the liquid crystal display element 1 and then the light is transmitted through the liquid crystal display element 1 to be emitted. When outer light is used, the outer light incident from the front of the liquid crystal display element 1 onto its front face is transmitted through the liquid crystal display element 1 and reflected on the illumination panel 10, and then the reflected light is again transmitted through the liquid crystal display element 1 to be emitted ahead of the element.

First, display using light from the illumination panel 10 will be described. When this illumination panel 10 is used, the light source section 14 of the illumination panel 10 is switched on.

The light from this light source section 14 is taken in the photoconductor 11 from its incident end face 11a, and then is introduced into this photoconductor 11 to be emitted from the step differentiating faces 12b of the stepwise face 12 along the path shown by solid lines in FIG. 2.

Light other than the light going toward the step differentiating faces 12b, among the light taken in the photoconductor 11 from its incident end face 11a, becomes light going in the direction substantially parallel to the back face of the photoconductor or light going toward the respective step faces 12a and the back face of the photoconductor. The light is then guided through the photoconductor 11 in its length direction while the light is reflected on the reflective films 13 of the respective step faces 12a, the interface between the back face of the photoconductor and the atmosphere (the air), and the reflective plate 17 arranged oppositely to the back face of the photoconductor. The direction of the light is changed into the direction of the step differentiating faces 12b, and then the light is emitted from the step differentiating faces 12b.

The light emitted from the step differentiating faces 12b of the stepwise face 12 of the photoconductor 11 is projected into the incident portions 22, in a projection form, formed at the back of the optical film 21. Among the light emitted from the step differentiating faces 12b, there is light radiating toward the next step differentiating face 12b, as shown FIG. 2. The light is however reflected on the reflective film 13 on the next step differentiating face 12b and then projected into the incident portions 22.

As described above, each of the step differentiating faces 12b of the photoconductor necessarily corresponds to at least one of the incident portions 22 of the optical film 21. Thus, the light emitted from the respective step differentiating faces 12b of the photoconductor 11 does not become loss light and is projected into any one of the incident portions 22.

The light projected into the incident portions 22 is taken in the incident portions 22 from the incident faces 22a of the incident portions 22, and then is totally reflected on the refractive faces 22b between the opposite side photoconductor and the air to be emitted ahead of the optical film 21.

In this embodiment, the inclination angle of the refractive faces 22b of the incident portions 22 is set so that the direction of the light reflected on these faces is along the direction of the normal of the front face of the optical film 21 (the front direction). Accordingly, the light emitted ahead of the optical film 21 is light having a distribution wherein brightness is high at the front direction of this photoconductor 21.

The light emitted ahead of the optical film 21, that is, the light emitted from the illumination panel 10 is projected into the liquid crystal display element 1 from its back face and then is transmitted through the liquid crystal display element 1 to be emitted ahead of the element.

Next, display using outer light will be described. At this time, the outer light incident on the liquid crystal display element 1 from the front of the element is transmitted through the liquid crystal display element 1 so as to be projected into the optical film 21 of the illumination panel 10 from its front.

As described above, in this embodiment the illumination panel 10 is arranged so that the side where its light source section 14 is arranged is directed to the upper end side of the screen (the upper end side of the liquid crystal display element 1), which corresponds to the direction along which outer light is mainly taken in the liquid crystal display device. For this reason, the light incident on the optical film 21 is projected, mainly from the side where the light source section 14 is arranged.

The outer light incident on the optical film 21 from its front is guided in the optical film 21 in its thickness direction, along paths shown by dot lines in FIG. 2, and then is emitted from its back face. The light is then reflected on the reflective films 13 formed on the step faces 12a of the photoconductor 11.

The outer light on the optical film 21 from its front is projected into the film at various incident angles, as shown in FIG. 2. Light going toward the refractive faces 22b of the respective incident portions 22 at the back of the film and toward the incident/emitting faces 23 between the adjacent incident portions 22, among the light incident on the optical film, is transmitted through the interfaces between these faces 22b and 23 and the air, emitted from the back face, and then reflected on the reflective films 13 formed on the step faces 12a of the photoconductor 11.

Light going from the front toward the incident faces 22a of the respective incident portions 22 is totally reflected on the interfaces between the incident faces 22a and the air, so that its direction is changed. The light is emitted from the refractive faces 22b or the incident/emitting faces 23 to the back face and then is reflected on the reflective films 13 on the respective step faces 12a of the photoconductor 11.

The light reflected on the reflective films 13 on the step faces 12a of the photoconductor 11 is taken in the optical film 21 from its back face, and is guided in the optical film 21 along its thickness direction to be emitted from its front.

At this time, almost all of the light reflected on the reflective films 13 on the step faces 12a of the photoconductor 11 is taken in from the refractive faces 22b and the incident/emitting faces 23 because the angles between the respective step faces 12a and the incident faces 22a of the respective incident portions 22 are large. However, light going toward the incident faces 22a, among the light taken in, is totally reflected on the interfaces between these faces 22a and the air so that its direction is changed. Thus, the light goes in a direction similar to the direction of the light going directly from the refractive faces 22b and the incident/emitting faces 23 to the front face of the photoconductor. For this reason, the light emitted ahead of the optical film 21 is high brightness light that the light incident on the optical film 21 from its front is concentrated. This emitted light is light having such a brightness distribution wherein the brightness of the light emitted toward the front of the optical film 21 is high.

The light emitted ahead of the panel from the front face of the optical film 21, that is, the light obtained by reflecting outer light incident from the front on the illumination panel 10 is projected into the liquid crystal display element 1 from its back face, transmitted through this liquid crystal display element 1, and then emitted ahead of the element.

Namely, the illumination panel 10 is a panel for taking light from the light source section 14 into the photoconductor 11, from its incident end face 11a, emitting the light from the step differentiating faces 12b of the photoconductor 11, taking the light into the optical film 21, form its back face, and emitting the light to the front face of the optical film 21; and further for emitting light incident on the optical film 21 from the front, to the back face of the optical film 21, reflecting the light on the respective step faces 12a of the photoconductor 11, taking the reflected light into the optical film 21 from its back face, and emitting the light from the front face of the optical film 21 ahead of the panel. Furthermore, this illumination panel 10 has a function of not only emitting light from the light source section 14 ahead of the panel, but also reflecting the outer light incident from the front of the panel and emitting toward the front of the panel.

Therefore, according to this illumination panel 10, it is possible to emit light from the light source section 14 and outer light incident from the front of the panel, respectively, ahead of the panel. Moreover, almost all of the light from the light source section 14 which is taken into the photoconductor 11 is emitted from the step differentiating faces 12b of the photoconductor 11, and the light is taken in the optical film 21 and then emitted ahead from its front face. In addition, outer light incident on the front face of the optical film 21 from the front of the panel is transmitted through the optical film 21 and then reflected on the step faces 12a of the photoconductor 11, and further the reflected light is transmitted through the optical film 21 and then emitted ahead from its front face. Therefore, in either case wherein the light from the light source section 14 is emitted or the outer light incident from the front of the panel is emitted, it is possible to emit the light efficiently F toward the front of the panel and obtain the emitted light having a high brightness.

That is, the illumination panel 10 is a panel which in principle makes it possible to emit about 100% of the light from the light source section 14 and reflect about 100% of the outer light incident from the front of the panel to emit the light. Furthermore, in the aforementioned embodiment, the optical film 21 has a structure wherein the incident portions 22 are arranged at intervals and the areas behind the photoconductor 11 and between the respective incident portions 22 are made into incident/emitting faces 23 corresponding to the reflective faces 13 on the respective step faces 12a of the photoconductor. For this reason, it is possible to emit the outer light incident from the front of the optical film 21 from the respective incident portions 22 at the back side of the optical film 21 and incident/emitting faces 23 between them, and to take the light reflected on the respective step faces 12a of the photoconductor 11 from the respective incident portions 22 and the incident/emitting faces 23 between them into the optical film and then emit the light ahead of the panel.

The illumination panel 10 is a panel wherein the front face of the photoconductor 11, the front side being stepwise, and the back face, at which the incident portions 22 are disposed, of the optical film 21 are arranged oppositely to each other. The pitch (P1) of the step differentiating faces 12b of the photoconductor 11 is different from the pitch (P2) of the incident portions 22 of the optical film 21. Even if the relative gap between the pitches (P1, P2) of the step differentiating faces 12b of the photoconductor 11 and the incident portions 22 of the optical film 21 is not periodical or the period thereof is long, it is possible to emit good light having no moire fringes.

That is, in the case wherein the pitch (P1) of the step differentiating faces 12b of the photoconductor 11 is made equal to the pitch (P2) of the incident portions 22 of the optical film 21, any moire fringes are not generated in the emitted light if working accuracy of the photoconductor 11 and the optical film 21 has no accidental error. In reality, however, some error cannot be avoided. When the working accuracy of the photoconductor 11 and the optical film 21 has an error, a periodical gap arises between the pitch (P1) of the step differentiating faces 12b of the photoconductor 11 and the incident portions 22 of the optical film 21. Thus, moire fringes are generated in the emitted light.

However, if, as in the aforementioned embodiment, the pitch (P1) of the step differentiating faces 12b of the photoconductor 11 and the pitch (P2) of the incident portions 22 of the optical film 21 are designed to be different from each other, the relative pitch gap between the step faces 12a of the photoconductor 11 and the incident portions 22 of the optical film 21 does not become periodical whether or not there is an error of the producing accuracy of the photoconductor 11 and the optical film 21. Alternatively, even if the gap becomes periodical, the period thereof becomes long. Accordingly, any moire fringes are not generated in the emitted light.

The liquid crystal display device is a device wherein behind the liquid crystal display element 1 the illumination panel 10 is arranged for emitting the light from the light source section 14 and the outer light incident from the front of the panel, respectively, ahead of the panel. Therefore, two way display can be carried out without using any semi-transmission reflective plate.

According to the aforementioned liquid crystal display device, therefore, the loss of light does not arise by the semi-transmission reflective plate. Moreover, the illumination panel 10 makes it possible to emit efficiently both of the light from the optical source section 14 and the outer light incident from the front of the panel, ahead of the panel. Thus, it is possible to brighten sufficiently both of the display using the outer light and the display using the light from the illumination panel 10.

Besides, since the illumination panel 10 emits the light having a brightness distribution wherein the brightness of the light which is emitted in a given direction is high as described above, it is possible to display an image having a high front brightness by designing this illumination panel 10 in such a manner that the panel 10 emits light having a brightness distribution wherein the brightness of the light emitted in the front direction is high (designing the inclination angle of the refractive faces 22b). Additionally, since the illumination panel 10 emits light having no moire fringes as described above, the displayed image of the liquid crystal display device is a good image having no moire fringes.

Figure 4A:
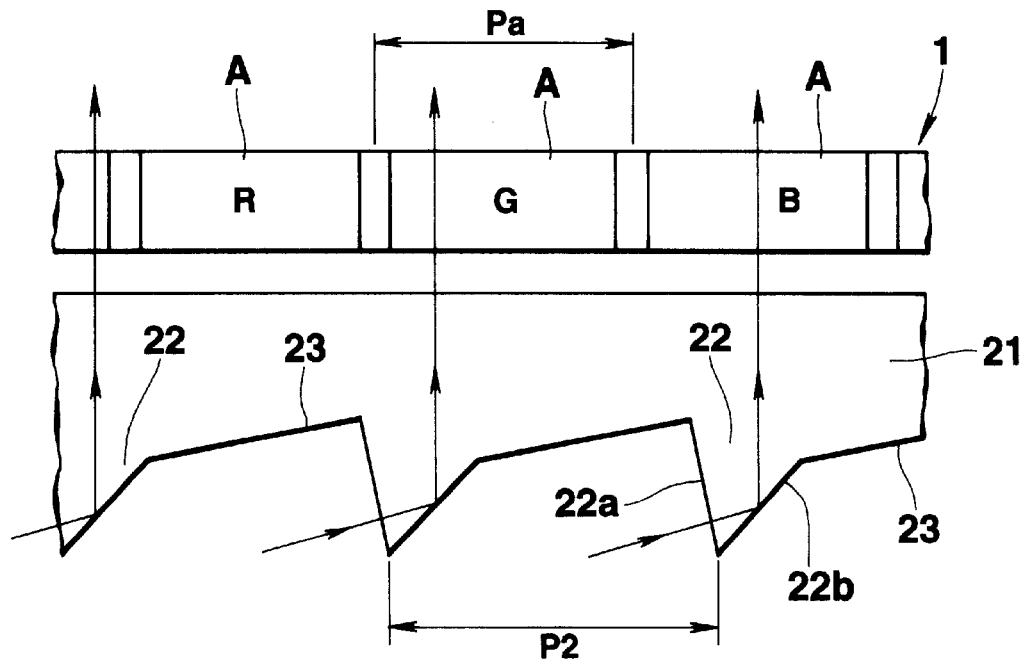
FIGS. 4A and 4B are cross sections of the display device according to the first embodiment of this invention.
Figure 4B:
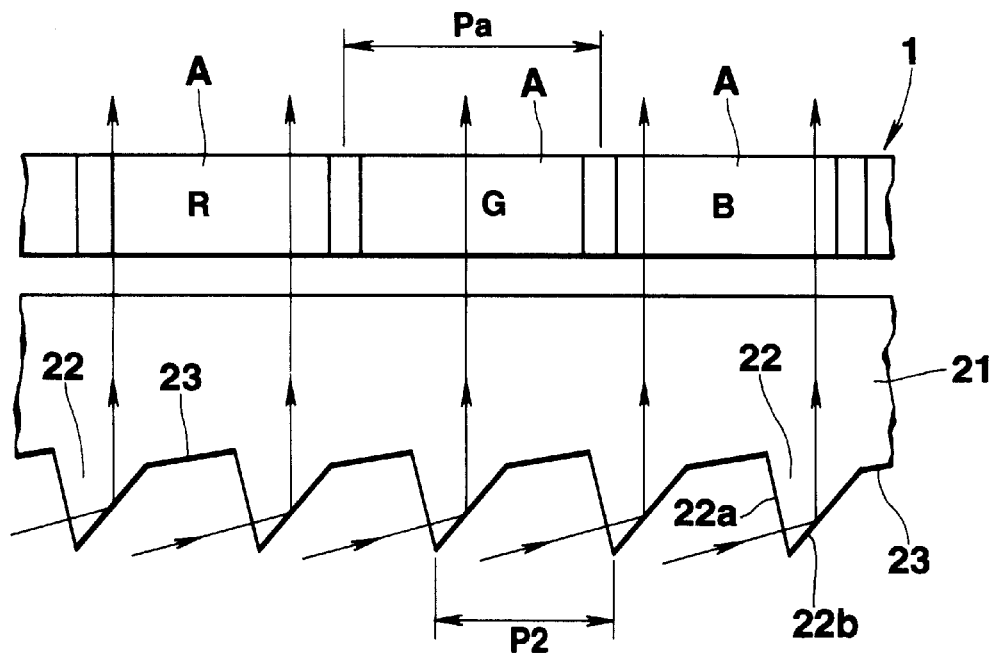

FIG. 4A and FIG. 4B show the state of light source light incident on the liquid crystal display element 1 in the cases wherein the pitch P2 of the incident portions 22 of the optical film 21 is larger than the pixel pitch Pa of the liquid crystal display element 1 and wherein the pitch P2 of the incident portions 22 of the optical film 21 is smaller than the pixel pitch Pa of the liquid crystal display element 1.

The respective pixel portions A of the liquid crystal display element 1 are constituted by areas wherein pixel electrodes and opposite electrodes are opposite to each other. In FIGS. 4A and 4B, however, the liquid crystal display element 1 is simplified and illustrated. In FIGS. 4A and 4B, among the respective pixel portions A of the liquid crystal display element 1, R, G and B show a pixel portion having a red color filter, a pixel portion having a green color filter and a pixel portion having a blue color filter, respectively.

FIG. 4A shows the state of light source light incident on the liquid crystal display element 1 in the cases wherein the pitch P2 of the incident portions 22 of the optical film 21 is larger than the pixel pitch Pa of the liquid crystal display element 1. In this case, sufficiently bright light is projected into the pixel portions A (the illustrated pixel portions G and B having the green and blue color filters, respectively) corresponding to areas corresponding to the incident portions 22 of the optical film 21 (the areas will be referred to as light source light emitting areas, hereinafter), among the respective pixel portions A of the liquid crystal display element 1, as shown by solid arrows in FIG. 4A. However, light is hardly projected into the pixel portions A not corresponding to the light source light emitting areas (the illustrated pixel portions R having the red color filter) of the optical film 21.

FIGS. 4A and 4B show the light emitted from the central portion of the respective light source light emitting areas of the optical film 21. The light emitted from the step differentiating faces 12*b* of the photoconductor 11 is projected into the incident portions 22 from their incident faces 22*a* at various incident angles, and the light is totally reflected in the directions dependent on incident angles onto the refractive faces 22*b*. Thus, the light emitted from the respective light source light emitting areas of the optical film 21 is light having a certain breadth.

Accordingly, light is slightly emitted from areas corresponding to the portions (incident/emitting faces 23) between the incident portions 22 of the optical film 21. The light is however light having a very low brightness distribution, as described above. Therefore, only a little light is projected into the pixel portions A which do not correspond to the light source light emitting areas of the optical film 21 in the liquid crystal display element 1.

Accordingly, even if the respective pixel portions A of the liquid crystal display element 1 are driven into the state that light can be transmitted through them, light is hardly emitted from the pixel portions into which the light emitted from the optical film 21 are hardly projected. For this reason, a poor image is displayed, wherein some lighting pixels are missing.

On the other hand, FIG. 4B shows the state of light source light incident on the liquid crystal display element 1 in the cases wherein the pitch P2 of the incident portions 22 of the optical film 21 is smaller than the pixel pitch Pa of the liquid crystal display element 1. In this case, all of the pixel portions A of the liquid crystal display element 1 correspond to at least one of the light source light emitting areas (areas corresponding to the incident portions 22) of the optical film 21. Thus, the light emitted from at least one of the light source light emitting areas of the optical film 21 is necessarily projected into each all of the pixel portions A of the liquid crystal display element 1, so that light is emitted from all of lighting pixel portions of the liquid crystal display element 1. Thus, a good image is displayed, wherein no lighting pixels are missing.

It is allowable that the P2 of the incident portions 22 of the optical film 21 is not more than the pixel pitch Pa of the liquid crystal display element 1. For example, in the case wherein the pitch P2 of the incident portions 22 is the same as the pixel pitch Pa, the light emitted from any one of the light source light emitting areas of the optical film 21 is necessarily projected into each all of the pixel portions A of the liquid crystal display element 1. Thus, a good image is displayed, wherein no lighting pixels are missing.

If the pitch P2 of the incident portions 22 of the optical film 21 is made far smaller than the pixel pitch Pa of the liquid crystal display element 1, the light emitted from the light source light emitting areas of the optical film 21 can be projected into each all of the pixel portions A of the liquid crystal display element 1.

The pixel pitch Pa of the liquid crystal display element 1 varies dependently on the resolution of the m liquid crystal display element. The pixel pitch Pa of liquid crystal display elements for displaying images with a high resolution is very small, that is, 10 to 50 $\mu$m. However, the pixel pitch Pa of liquid crystal display elements for displaying images whose resolution is not required to be high may be 300 $\mu$m or more.

On the other hand, the optical film 21 is produced by molding an acrylic resin or the like, or by cutting-processing it. As the pitch P2 of the incident portions 22 becomes smaller, costs for the production become higher.

For this reason, it is desired that according to the pixel pitch Pa of the liquid crystal display element 1 the pitch P2 of the incident portions 22 of the optical film 21 is set to satisfy the following ranges and the relationship of Pa$\leq$P2.

In the case of 10$\leq$Pa$\leq$50 $\mu$m, P2=5 to 50 $\mu$m;
in the case of 50 $\mu$m<Pa$\leq$100 $\mu$m, P2=20 to 100 $\mu$m,;
in the case of 100 $\mu$m<Pa$\leq$300 $\mu$m, P2=50 to 300 $\mu$m, and
in the case of Pa>300 $\mu$m, P2=100 $\mu$m to 500 $\mu$m.

In other words, it is desired that dependently on the pixel pitch of the used liquid crystal display element 1, that is, resolution, the pitch P2 of the incident portions 22 of the optical film 21 is set within the range that a good image wherein no lighting pixels are missing can be displayed in the liquid crystal display element. The optical film can be produced at a cost matching the resolution of the used liquid crystal display element by setting the pitch P2 of the incident portions 22 in such a manner as above.

If the P2 of the incident portions 22 of the optical film 21 is not more than the pixel pitch Pa of the liquid crystal display element 1, a good image wherein no lighting pixels are missing can be displayed in the liquid crystal display element 1. The pitch P2 of the incident portions 22 is more preferably a pitch smaller than the pixel pitch Pa of the liquid crystal display element 1. If the pitch P2 of the incident portions is made different from the pitch Pa of the liquid crystal display element 1 in this manner, it is possible to prevent moire fringes from arising in the light emitted from optical film 21, transmitted through the liquid crystal display element 1 and emitted toward its front.

If the pitch 2 of the incident portions 22 of the optical film 21 is made smaller than the pixel pitch Pa of the liquid crystal display element 1 in this manner and further the pitch P1 of the step differentiating faces 12*b* of the photoconductor 11 is made different from the pitch P2 of the incident portions 22 of the optical film 21 as described above, moire fringes are more effectively removed, so that a better image can be displayed.

Figure 5:
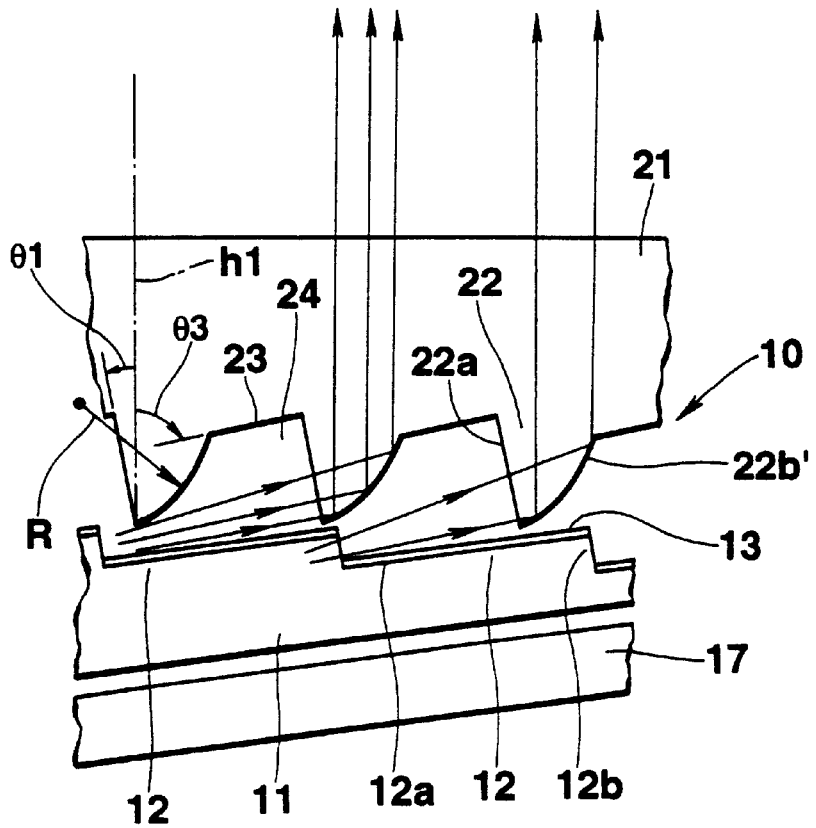
FIG. 5 is an enlarged partial cross section of FIG. 1, illustrating paths of incident light and emitted light on/from the display device using an illumination panel different from that in the first embodiment by arrows.

FIG. 5 is an enlarged cross section of a part of an illumination panel according to another embodiment of this invention. In this illumination panel 10 of this embodiment, the refractive faces 22*b* opposite to the incident faces 22*a* of the respective incident portions 22*a* of the optical film 21 are made into light-concentrating refractive faces 22*b'* which are curved face.

In this illumination panel 10 of this embodiment, the refractive faces 22*b'* of the incident portions 22*a* of the optical film 21 are made into light-concentrating refractive faces 22*b'*. Other structure is however the same as the first embodiment shown in FIGS. 1 and 2. Thus, overlapping explanation is omitted by attaching the same reference numbers in the figure.

According to the illumination panel 10 of this embodiment, light that is emitted from the step differentiating faces 12*b* of the photoconductor 11, taken in from the incident faces 22*a* of the incident portions 22 of the optical film 21, and refracted ahead of the light-concentrating refractive faces 22*b'*, which is located at the opposite side and is a curved face having a radius of curvature of several hundred $\mu$m, by the light-concentrating refractive faces 22*b'* is concentrated in a given direction, as shown by paths drawn by illustrated solid lines, by light-concentrating effect of the light-concentrating refractive faces 22*b'*. Thus, for example, it is possible to emit light having a brightness distribution wherein the brightness in the given direction is high.

In FIG. 5, incident and reflection paths of outer light are not illustrated, but the outer light also makes it possible to emit light having a brightness distribution wherein the brightness in the given direction is high by light-concentrating effect of the light-concentrating refractive faces 22*b'*.

Accordingly, if the illumination panel 10 of this embodiment is used, an image having a high front brightness can be displayed by designing the illumination panel 10 to emit light having a brightness distribution wherein the brightness of the light emitted toward the front is high (designing the light-concentrating refractive faces 22b').

In the respective embodiments, as the optical film 21 a film wherein incident portions 22 are disposed at its back face is used. However, an optical film having any structure may be used if the film is a film for taking in light emitted from the step differentiating faces 12b of the photoconductor 11 from its back face and emitting the light toward its front face, and in addition for emitting light incident from the front of the panel toward the its back face and taking in light reflected on the reflective films 13 on the step differentiating faces 12b of the photoconductor 11 from its back face and emitting ahead of the panel.

The light source section 14 of the illumination panel 10 is not limited to a section wherein the fluorescent lump 15 is used. For example, a section using an LED array wherein plural LEDs (Light Emitting Diodes) are arrayed is allowable.

Figure 6:
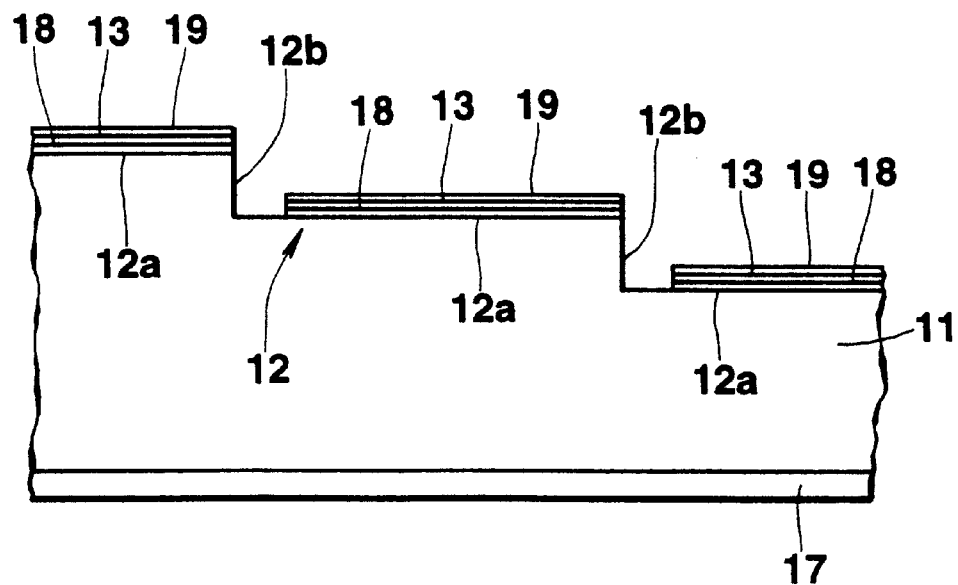
FIG. 6 is an enlarged partial cross section, illustrating an embodiment different from the photoconductor in the illumination panel according to the first embodiment.

As shown in FIG. 6, concerning the structure of the reflective films 13 deposited on the step faces of the photoconductor representing this embodiment, the corrosion, damage, exfoliation and the like of the reflective films 13 are prevented by depositing an undercoat film 18 having a high adhesion onto both of the photoconductor 11 and the reflective films 13 on the step faces 12a of the photoconductor 11 to form the reflective films 13 on the undercoat film 18 and further by depositing a transparent overcoat film 19 on the reflective films 13. Thus, the reliability of the reflective films 13 can highly be improved.

The undercoat film 18 is not formed on the step differentiating faces 12b of the photoconductor 11 but is formed on only the step faces 12a and over the whole areas where the reflective films 13 are formed.

The undercoat film 18 is preferably deposited by vapor-depositing or sputtering an overcoat material (SiO$_2$ or SiO) from the direction inclined from the normal of the step faces 12a toward the step differentiating faces 12b at a given angle (preferably 30 to 60 degrees) in the same manner as in the process for producing the reflective films 13. According to this process, the undercoat film 18 can be made on only the step faces 12a in a single step. It is sufficient that the thickness of the undercoat film 18 is from about 30 nm to about 50 nm.

On the other hand, the overcoat film 19 is a transparent thin film made of SiO$_2$, SiO, a fluorine-based resin, a silica-based resin or the like. In this embodiment, this overcoat film 19 is not formed on the step differentiating faces 12b of the photoconductor 11 but on only the step faces 12a to cover the whole surfaces of the reflective films 13.

In the case in which the overcoat film 19 is made of SiO$_2$ or SiO, this overcoat film 19 is preferably deposited by vapor-depositing or sputtering an overcoat material (SiO$_2$ or SiO) from the direction inclined from the normal h2 of the step faces 12a toward the incident end face 11a at a given angle (preferably 30 to 60 degrees) in the same manner as the undercoat film 18. According to this process, the overcoat film 19 can be made on only the step faces 12a in a single step.

In the case in which the overcoat film 19 is made of a transparent resin such as a fluorine-based resin or a silica-based resin, it is desired that this overcoat film 19 is formed by the roller coat method of applying the film by a coating roller.

According to this photoconductor structure, the undercoat film 18 having a high adhesion onto both of the photoconductor 11 and the reflective films 13 on the step faces 12a of the photoconductor 11 and then the reflective films 13 are formed on this undercoat film 18, so that the adhesion of the reflective films 13 to the step faces 12a can be made better.

Since the overcoat film 19 is deposited on the reflective films 13, the reflective films 13 are protected by the overcoat film 19 so that the humidity-resistance of the reflective films 13 can be improved.

Besides, in this embodiment, the undercoat film 18 and the overcoat film 19 are not formed on the step differentiating faces 12b but are formed on only the step faces 12a. Accordingly, the light emitted from the step differentiating faces 12b is emitted toward the front side without being transmitted through the undercoat film 18 nor the overcoat film 19, whereby the light taken in from the incident end face 11a of the photoconductor 11 can be emitted from the step differentiating faces 12b toward the front side at a high emitting efficiency.

In the case in which the overcoat film 19 is deposited on the reflective films 13, as in this embodiment, it is desired that the overcoat film 19 is formed to have a thickness which is not less than the thickness making it possible to improve the humidity-resistance of the reflective films 13 sufficiently and is not more than such a thickness that the overcoat film 19 hardly absorbs light.

In the case in which the overcoat film 19 is made of any one of SiO$_2$, SiO, a fluorine-base resin and a silica-based resin, a desirable thickness of the overcoat film 19 is in the range from 30 to 200 nm. If the thickness of the overcoat film 19 is within this range, it is possible to improve the humidity-resistance of the reflective films 13 sufficiently and reflect light incident from the front, at a high reflectivity, ahead without light absorption in the overcoat film 19.

Furthermore, the liquid crystal display device of the aforementioned embodiment is a device wherein a TN type liquid crystal display element 1 is in an active matrix form. The liquid crystal display element may be a simple matrix form or a segment form, and is not limited to the TN type. The following liquid crystal display elements are allowable: STN (Super Twisted Nematic) type, ECB (double refraction effect) type, dynamic scattering effect type, ferroelectricity-using liquid crystal display element or the like.

The display device of the aforementioned embodiment is a device wherein the liquid crystal display element 1 is used as a display means, but this invention is applied to not only the liquid crystal display device but also other electro-optical display elements and display devices whose display means is a transparent image-printed film or the like. Moreover, the illumination panel of this invention can widely be used as not only a display device but also various applications.

[Second Embodiment]

Figure 7:
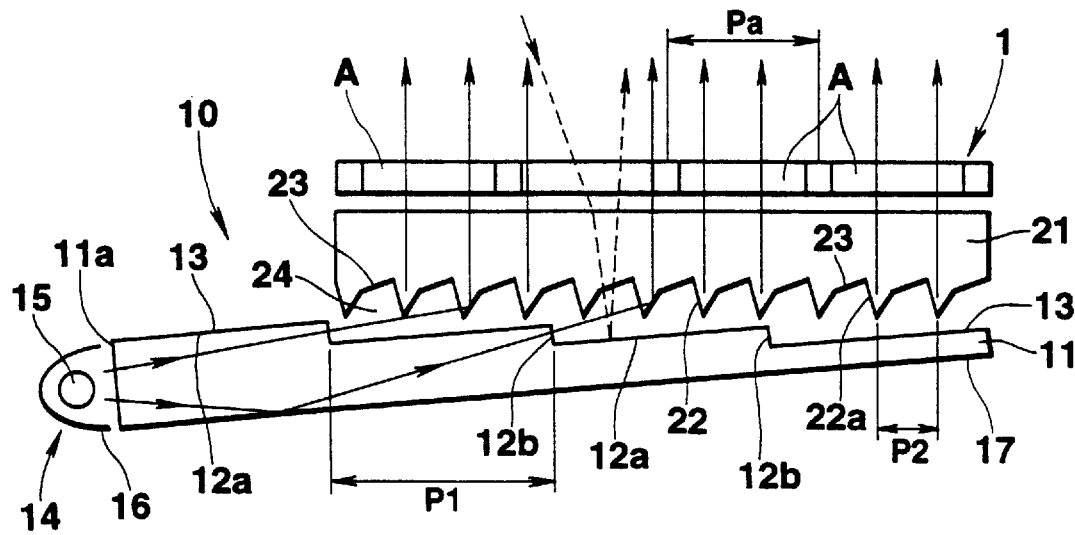
FIG. 7 is a cross section illustrating a display device using an illumination panel according to a second embodiment of this invention.

In a display device according to the second embodiment of this invention, shown in FIG. 7, the incident portions 22 of the optical film 21 are arranged at a pitch that is smaller than both of the arrangement pitch of the pixel portions A of the liquid crystal display element 1 (which will be referred to as a pixel pitch, hereinafter) and the pitch of the step differentiating faces 12b of the photoconductor 11, and further the pitch of the step differentiating faces 12b of the photoconductor 11 is set to a pitch different from the pixel pitch of the pixel portions A of the liquid crystal display element 1.

Namely, when Pa, P1 and P2 represent the pixel pitch of the liquid crystal display element 1, the pitch along the plane of the pixel portions A of the step differentiating faces (emitting faces) of the photoconductor 11, and the pitch of the incident portions 22 of the optical film 21, respectively, these pitches Pa, P1 and P2 are set to satisfy the relationship of P1>Pa>P2 in this embodiment.

In the figure, for convenience' sake, the pixel portions A of the liquid crystal display element 1, the stepwise face 12 of the photoconductor 11, the respective incident portions 22 of the optical film 21, and incident/emitting faces 23 between them are enlarged and illustrated. However, the area of the pixel portions A of the liquid crystal display element 1 is very small, and these pixel portions A are arranged at the pitch Pa corresponding to the width of the pixel portions A and the width of spaces (portions painted out in black in FIG. 7) between the adjacent the pixel portions. The pitch P2 of the incident portions 22 of the optical film 21 is set correspondingly to the pixel pitch Pa of the liquid crystal display element 1, and the pitch P1 along the plane of the pixel portions A of the step differentiating faces 12b of the photoconductor 11 is set correspondingly to the pitch P2 of these incident portions 22.

In this display device, the illumination panel or means 10 is arranged at the back of the liquid crystal display element 1 in such a manner that the side where the light source section 14 is arranged is directed to the direction along which outer light is mainly taken in.

In this display device, when sufficiently bright outer light is obtained, reflection type display using the outer light is carried out. When sufficiently bright outer light is not obtained, the light source section 14 of the lighting means 10 is switched on to carry out transmission type display using light source light. When the light source light is used, the light emitted from the lighting means 10 is projected into the liquid crystal display element 1 from its back face, and then the light is transmitted through the liquid crystal display element 1 to be emitted ahead.

When outer light is used, the outer light incident from the front of the liquid crystal display element 1 is transmitted through the liquid crystal display element 1 and is reflected on the lighting means 10 behind it. The reflected light is again transmitted through the liquid crystal display element 1 to be emitted ahead.

First, the transmission type display using light from the lighting means 10 will be described. The light source section 14 of the lighting means 10 is switched on when this lighting means 10 is used.

The light from this light source section 14 is taken in the photoconductor 11 from its incident end face 11a, and then is introduced into this photoconductor 11 to be emitted from the step differentiating faces 12b of the stepwise face 12.

In this case, light other than the light going toward the step differentiating faces 12b, that is, light going toward the respective step faces 12 a of the stepwise face 12 and the back face of the photoconductor 11, among the light taken in the photoconductor 11 from its incident end face 11a, is reflected on the reflective films 13 on the respective step faces 12a and the reflective film 17 on the back face of the photoconductor and is guided in the photoconductor 11, in its length direction. In this step, the direction of the light is changed toward any one of the step differentiating faces 12b. The light is emitted from the step differentiating faces 12b.

The reflective films 13 may be opposite to the back face of the photoconductor 11 through a space. In this case, light going toward the back face of the photoconductor among the light taken in photoconductor 11 from its incident end face 11a is reflected on an interface between the back face of the photoconductor 11 and the air layer in the space.

However, light incident on the interface between the back face of the photoconductor and the air at an incident angle that is smaller than the critical total reflection angle (an incident angle near the perpendicularity), among the light going toward the back of the photoconductor, is transmitted through the interface and then is leaked toward the back face side. However, the leaked light is reflected on the reflective film 17 and then is again projected into the photoconductor 11 from its back face.

This light which is again projected from the back face is reflected on the reflective films 13 on the respective step faces 12a, and then the light which is reflected on the interface between the photoconductor back face and the air and goes toward the step differentiating faces 13b, among the reflected light, is emitted from the step differentiating faces 12b. The leaked light transmitted through the interface is reflected on the reflective plate 12 and then is again projected into the photoconductor 11 from its back face. By repeating this, therefore, the light leaked toward the back face side of the photoconductor 11 can also be emitted from the step differentiating faces 12b without being in vain.

Each of the light rays emitted from the step differentiating faces 12b of the photoconductor 11 is projected into any one of the incident portions 22, in a projection form, formed on the back face of the optical film 21.

That is, since the pitch P2 of the incident portions 22 of the optical film 21 is smaller than the pitch P1 along the plane of the pixel portions A of the step differentiating faces (emitting faces) 12b of the photoconductor 11 as described above, one or more incident portions 22 of the optical film 21 necessarily correspond to the respective step differentiating faces 12b of the photoconductor 11. Accordingly, almost all of the light emitted from the step differentiating faces 12b of the photoconductor 11 does not become loss light and is taken in any one of the incident portions 22 of the optical film 21 from their incident faces 22a.

Among the light emitted from the step differentiating faces 12b of the photoconductor 11, there is light emitted toward the next step face 12a. However, the light is reflected on the reflective film 13 on the next step face 12a to be projected into the incident portions 22 of the optical film 21.

The respective light rays incident on the respective incident portions 22 of the optical film 21 are taken in the incident portions 22 from the incident faces 22a of the incident portions 22.

As described above, in this embodiment the incident faces 22a of the incident portions 22 are faces wherein the angle $\theta_1$ between this face and the normal h1 of the front face of the optical film 21 is in the range from 5 to 15 degrees, and the incident faces 22a are opposite to the step differentiating faces 12b of the photoconductor 11 in parallel or in substantially parallel. For this reason, almost all of the light emitted from the step differentiating faces 12b of the photoconductor 11 is projected onto the incident faces 22a at a substantially perpendicular incident angel, and is transmitted through the incident faces 22a to be taken in the incident portions 22.

The light taken in the incident portions 22 from the incident faces 22a is projected onto the opposite refractive incident faces 22b, and then is totally reflected on the optical interfaces 22b. The light is then refracted ahead (toward the front face of the optical film 21) and is emitted from the front face of the optical film 21 ahead.

The following will describe the display using outer light. In this case, outer light is projected into the liquid crystal display element 1 from its front face at various incident angles, and then the light transmitted through this liquid crystal display element 1 is projected into the optical film 21 in the lighting means 10 from its front face at various incident angels.

The light incident on the optical film 21 from its front face is emitted from its back face and then is reflected on the reflective films 13 on the step differentiating faces 12b of the photoconductor 11.

As described above, in this embodiment, the lighting means 10 is arranged in such a manner that the side where its lighting source section 14 is arranged is directed to the upper end side of its screen, which corresponds to the direction along which the outer light is mainly taken in the display device. Therefore, the outer light incident on the optical film 21 from its front is mainly light going toward the refractive faces 22b of the respective incident portions 22 at the back of the optical film 21 and the adjacent incident/emitting faces 23 of the incident portions 22.

The incident light is projected onto the refractive faces 22b and the incident/emitting faces 23 at an incident angle which is smaller than the critical total reflection angle, and therefore the light is transmitted through the interfaces 22b and 23, is emitted toward the back face side, and is reflected on the reflective films 13 on the step faces 12a of the photoconductor 11.

The light reflected on the reflective films 13 is taken in the optical film 21 from its back face and then guided in the optical film 21 along its thickness direction to be emitted ahead.

The light reflected on the reflective films 13 is projected into the optical film 21 from the incident portions 22 formed at the back face of the optical film 21 and the incident/emitting faces 23 between these incident portions 22. The incident faces 22a of the incident portions 22 are faces having an angle of 5 to 15 degrees to the normal h1 of the front face of the optical film 21, and the incident faces 22a are substantially perpendicular to the reflective films 13. Therefore, almost all of the light reflected on the reflective films 13 is taken in the incident/emitting faces 23 and the refractive faces 22b of the respective incident portions 22 of the optical film 21.

Light other than the light going the incident faces 22a among the light taken in from the opposite refractive faces 22b (light going toward the front face of the optical film 21), and the light taken in from the incident/emitting faces 23 are emitted from the front face of the optical film 21, and the light going toward the incident faces 22a among the light taken in from the refractive faces 22b is totally reflected on the incident faces 22a. so that its direction is changed ahead. Thus, the light is emitted from the front face of the optical film 21.

In this embodiment, the angle θ3 between the incident/emitting faces 23 and the normal h1 of the front face of the optical film 21 is set within the range from 70 to 90 degrees. Thus, the incident/emitting faces 23 are opposite to the reflective film 13 on the respective step faces 12a of the photoconductor 11 in substantially parallel. Accordingly, the light passing through the incident/emitting faces 23, among the outer light that is projected from the front of the optical film 21, is reflected on the reflective films 13 on the respective step faces 12a of the photoconductor 11, and then emitted ahead of the optical film 21, can be transmitted at a high transmissivity without being totally reflected on the incident/emitting faces 23.

For this reason, the reflected light which is emitted ahead of the optical film 21 is light having a high brightness, resulting from the concentration of the outer light incident on the optical film 21 from its front at various incident angles. This emitted light is also light having a brightness distribution wherein the brightness of the light emitted toward the front is high.

The reflected light emitted ahead of the optical film 21 is projected into the liquid crystal display element 1 from its back face and is transmitted through the respective the pixel portions A of this liquid crystal display element 1 to be emitted ahead.

Namely, the lighting means 10 has a function of not only emitting the illumination light from the light source section 14 ahead but also reflecting the outer light incident from the front to be emitted ahead. When the light source section 14 is switched on to carry out transmission type display, the light from the light source section 14 is taken in the photoconductor 11 from its incident end face 11a and emitted from the step differentiating faces 12b of the stepwise face 12, and the light is taken in the optical film 21 to be emitted from the front face of the optical film 21 ahead.

In this case, almost all of the light emitted from the step differentiating faces 12b of the photoconductor 11 is taken in the incident portions 22 at the back side of the optical film 21 from the incident faces 22a without substantial loss. The light is totally reflected on the refractive faces 22b of the incident portions 22 and thus refracted ahead so that the light becomes light having a brightness distribution having the directivity that the light is emitted with a high brightness in a given direction and thus the light is emitted ahead of the optical film 21. For this reason, the light from the light source section 14 can be emitted ahead efficiently.

When reflection type display using outer light is carried out, the outer light that is projected from the front of the liquid crystal display element 1, transmitted from this liquid crystal display element 1 and projected into the lighting means 10 behind it is transmitted through the optical film 21, reflected on the reflective films 13 on the step faces 12a of the stepwise face 12 of the photoconductor 11. The reflected light is transmitted through the optical film 21 to be emitted from its front face ahead.

In this case, the stepwise face 12 of the photoconductor 11 is composed of the step faces 12a and the step differentiating faces 12b connecting these step faces. The shape that the stepwise face 12 is viewed from the front is a shape that the step faces 12a can be substantially closely and continuously viewed. Accordingly, the photoconductor 11 exhibits substantially the same reflective characteristic against the outer light incident from the front as a reflective plate in a plain plate. Thus, the outer light incident from the front can be efficiently reflected.

In the aforementioned embodiment, the optical film 21 has a structure wherein the incident portions 22 are arranged at intervals and the areas between the respective incident portions 22 are made into the incident/emitting faces 23 for emitting the light incident from the front of the optical film 21 toward the back face side and projecting the light reflected on the reflective films 13 on the respective step faces 12a of the photoconductor 11 into the optical film 21. For this reason, it is possible to emit the light incident from the front of the optical film 21 from the incident portions 22 behind the optical film 21 and the incident/emitting faces 23 between them, and further take the light reflected on the reflective films 13 on the respective step faces 12a of the photoconductor 11 in the optical film 21 from the incident portions 22 and the incident/emitting faces 23 between them and then emit the light ahead.

For this reason, in the lighting means 10, in principle about 100% of the light from the light source section 14 is emitted ahead, and about 100% of the outer light incident from the front is reflected to be emitted ahead. In addition, both of the light from the light source section 14 and the reflected light of the outer light are emitted as light having a high front brightness.

On the other hand, in this display device, when transmission type display using the light source light is used, the light emitted from the step differentiating faces 12b of the photoconductor 11 in the lighting means 10 is taken in the incident portions 22 formed behind the optical film 21 from their incident faces 22a, and the light is refracted ahead by the refractive faces 22b of the incident portions 22 to be emitted from the front face of the optical film 21. Therefore, the light emitted ahead of the optical film 21 is light having a brightness distribution corresponding to the pitch P2 of the incident portions 22.

That is, the light emitted ahead of the optical film 21 at the time of the transmission display is light having a brightness distribution wherein the brightness of the light emitted from the areas corresponding to the incident portions 22 is high and the brightness of the light emitted from the areas corresponding to the incident/emitting faces 23 between the adjacent incident portions 22 is low.

When reflection type display using the outer light is used, the outer light incident from the front of the liquid crystal display element 1 is transmitted through the optical film 21 and reflected on the reflective films 13 on the step faces on the photoconductor 11 and then the reflected light is transmitted through the optical film 21 to be emitted from its front face ahead. The refractive state of the light incident from the incident portions 22 among the light that is reflected on the reflective films 13 and then is projected into the optical film 21 from its back face is different from the refractive state of the light incident from the incident/emitting faces 23 between the incident portions 22. Therefore, in this case of the reflection type display using the outer light, the light emitted from the front face of the optical film 21 ahead is likewise light having a brightness distribution corresponding to the pitch P2 of the incident portions 22 of this optical film 21.

However, in this display device the incident portions 22 of the optical film 21 are arranged at a pitch P2 that is smaller than the pixel pitch Pa of the liquid crystal display element 1. As a result, the light emitted from at least one of the areas corresponding to the incident portions 22 of the optical film 21 is necessarily projected into each all of the pixel portions A of the liquid crystal display element 1, and the light is emitted from all of the lighting pixel portions (pixel portions that are driven into the state that light is transmitted) of the liquid crystal display element 1. Accordingly, a good image can be displayed wherein no lighting pixels are missing.

As described above, in the aforementioned display device the pitch P1 along the plane of the pixel portions A of the step differentiating faces 12b of the photoconductor 11 is made different from the pitch P2 of the incident portions 22 of the optical film 21, and the pitch P2 of the incident portions 22 of the optical film 21 is made different from the pixel pitch Pa of the liquid crystal display element 1. Besides, the pixel pitch Pa of the liquid crystal display element 1 is made different from the pitch P1 along the plane of the pixel portions A of the step differentiating faces 12b of the photoconductor 11. Therefore, it is possible to remove moire fringes more effectively and further display a better image.

In this embodiment, the pitch P1 along the plane of the pixel portions A of the step differentiating faces 12b of the photoconductor 11 is made larger than the pixel pitch Pa of the liquid crystal display element 1, so that the stepwise face 12 of the photoconductor 11 can easily be worked.

In the case wherein, as in this embodiment, the pixel pitch Pa of the liquid crystal display element 1, the pitch P1 along the plane of the pixel portions A of the step differentiating faces 12b of the photoconductor 11, and the pitch P2 of the incident portions 22 of the optical film 21 are set to the relationship of P1>Pa>P2, the ratios of these pitches preferably satisfy at least one of the following:

P1/Pa=1.3 to 1.7, or 2.1 to 2.8, or 3.5 or more;
P1/P2=1.3 to 1.7, or 2.1 to 2.8, or 3.5 or more; and
Pa/P2=1.3 to 1.7, or 2.1 to 2.8, or 3.5 or more.

Moire fringes can be removed most effectively by the selecting the ratios of the respective pitches Pa, P1 and P2 in this manner.

That is, in the case wherein the respective pitches Pa, P1 and P2 are set to the relationship of P1>Pa>P2, these pitches are preferably set in such a manner that 1.3 to 1.7, 2.1 to 2.8 or 3.5 or more step differentiating faces 12b of the photoconductor 11 correspond to every pitch P2 of the incident portions 22 of the optical film 21, 1.3 to 1.7, 2.1 to 2.8 or 3.5 or more incident portions correspond to every pitch P1 of the step differentiating faces 12b of the photoconductor 11, and 1.3 to 1.7, 2.1 to 2.8 or 3.5 or more pixel portions A of the liquid crystal display element 1 corresponds to every pitch P1 of the step differentiating faces 12b of the photoconductor 11.

For example, when the pixel pitch Pa of the liquid crystal display element is 100 $\mu$m, the pitch P2 of the incident portions 22 of the optical film 21 is desirably, e.g., 40 $\mu$m and the pitch P1 of the step differentiating faces 12b of the photoconductor 11 is desirably, e.g., 150 $\mu$m. It is possible to display an image which does not have moire fringes at all.

Therefore, according to the aforementioned, it is possible to brighten sufficiently both of reflection type display using outer light and transmission type display using light source light and a good image wherein no lighting pixels are missing and moire fringes are not generated can be displayed in either display.

In the aforementioned, the pitch P1 of the step differentiating faces (emitting faces) 12b of the photoconductor 11 in the lighting means 10 is made larger than the pixel pitch Pa of the liquid crystal display element 1. However, the pitch P1 of the step differentiating faces 12b of the photoconductor 11 may be made smaller than the pixel pitch Pa of the liquid crystal display element 1.

In this case, however, the pitch P1 of the step differentiating faces 12b of the photoconductor 11 and the pitch P2 of the incident portions 22 of the optical film 21 are set to the relationship of P1>P2, and the pitch P2 of the incident portions 22 of the optical film 21 and the pixel pitch Pa of the liquid crystal display element 1 are set to the relationship of Pa>P2.

Figure 8:
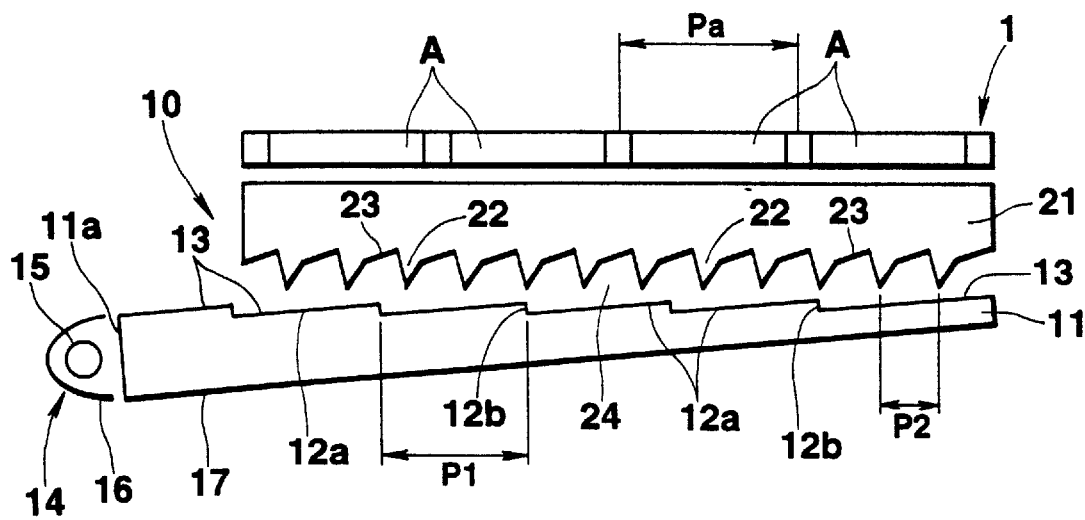
FIG. 8 is a cross section illustrating the display device using the illumination panel according to the second embodiment.

FIG. 8 is a cross section of a display device according to a different embodiment of this invention. In this embodiment, the pixel pitch Pa of the liquid crystal display element 1, the pitch P1 along the plane of the pixel portions A of the step differentiating faces (emitting faces) 12b of the photoconductor 11 in the lighting means 10, and the pitch P2 of the incident portions 22 of the optical film 21 are set to the relationship of P1>Pa>P2.

In the display device of this embodiment, the pixel pitch Pa of the liquid crystal display element 1 is larger than that in the second embodiment, and the pixel pitch Pa of the liquid crystal display element 1 and the pitch P1 of the step differentiating faces 12b of the photoconductor 11 satisfy the relationship (P1>Pa) contrary to that in the second embodiment. The basic structure of the display device is however the same as that of the second embodiment, and their effects and advantages are also the same. Thus, the same reference numbers are attached to the figure and overlapping explanation is omitted.

In the case wherein, as in this embodiment, the pixel pitch Pa of the liquid crystal display element 1, the pitch P1 along the plane of the pixel portions A of the step differentiating faces 12b of the photoconductor 11, and the pitch P2 of the incident portions 22 of the optical film 21 are set to the relationship of Pa>P1>P2, the ratios of these pitches preferably satisfy at least one of the following:

Pa/P1=1.3 to 1.7, or 2.1 to 2.8, or 3.5 or more;
P1/P2=1.3 to 1.7, or 2.1 to 2.8, or 3.5 or more; and
Pa/P2=1.3 to 1.7, or 2.1 to 2.8, or 3.5 or more.

Moire fringes can be removed most effectively by the selecting the ratios of the respective pitches Pa, P1 and P2 in this manner.

That is, in the case wherein the respective pitches Pa, P1 and P2 are set to the relationship of Pa>P1>P2, these pitches are preferably set in such a manner that 1.3 to 1.7, 2.1 to 2.8 or 3.5 or more step differentiating faces 12b of the photoconductor 11 correspond to every pitch P2 of the incident portions 22 of the optical film 21, 1.3 to 1.7, 2.1 to 2.8 or 3.5 or more incident portions of the optical film 21 correspond to every pitch P1 of the step differentiating faces 12b of the photoconductor 11, and 1.3 to 1.7, 2.1 to 2.8 or 3.5 or more step differentiating faces 12b correspond to every pixel pitch Pa of the liquid crystal display element 1.

For example, when the pixel pitch Pa of the liquid crystal display element 1 is 150 μm, the pitch P2 of the incident portions 22 of the optical film 21 is desirably, e.g., 40 μm and the pitch P1 along the plane of the pixel portions A of the step differentiating faces 12b of the photoconductor 11 is desirably, e.g., 100 μm. It is possible to display an image which does not have moire fringes at all by setting the ratios of the respective pitches Pa, P1 and P2, respectively, in this manner.

[3rd Embodiment]

Figure 9:
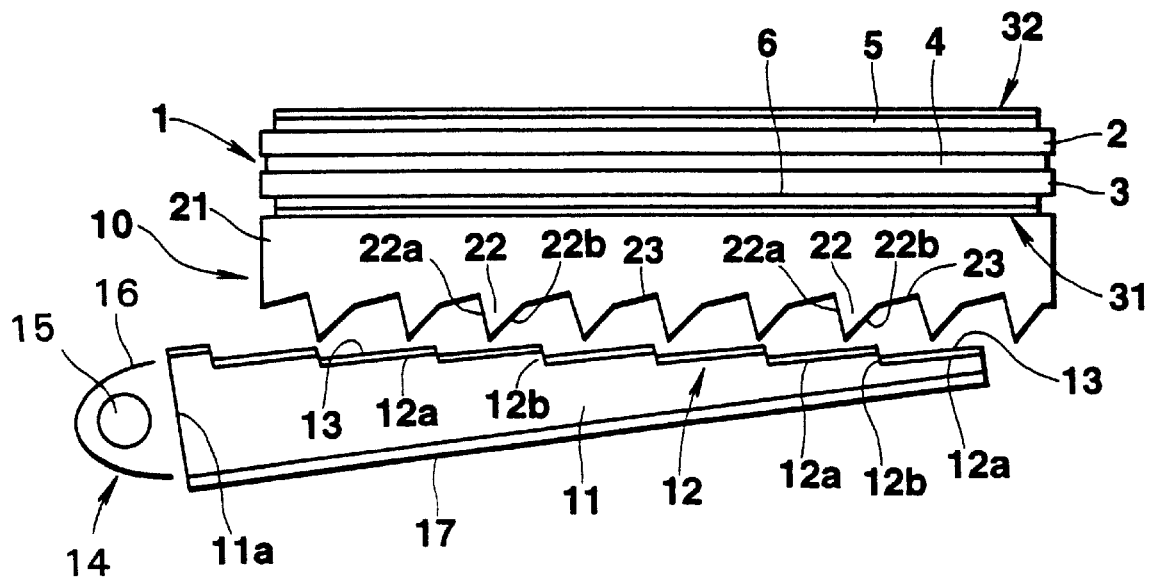
FIG. 9 is a cross section illustrating a display device according to a third embodiment of this invention.
Figure 10:
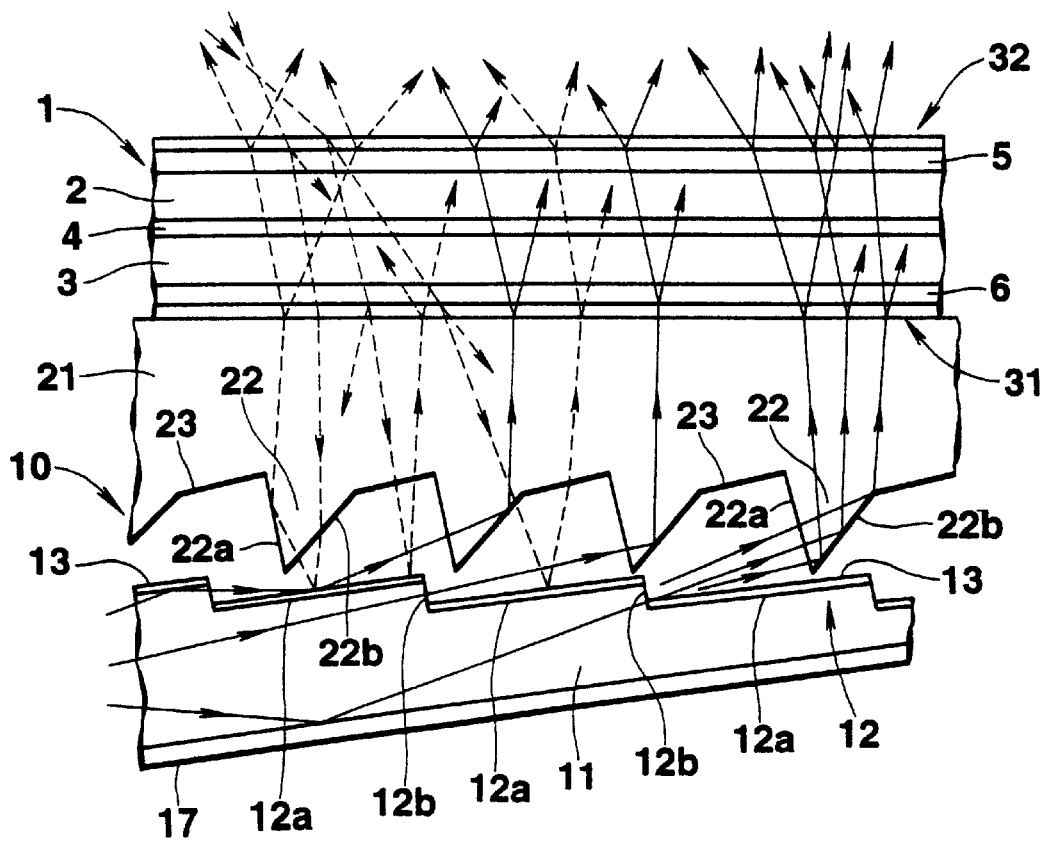
FIG. 10 is an enlarged partial cross section of FIG. 9, illustrating the third embodiment.

FIGS. 9 and 10 show the third embodiment of this invention. The display device of this embodiment is a device wherein a liquid crystal display element is used as a transmission type display member for controlling transmission of light for display. As shown in FIGS. 9 and 10, the device comprises an illumination panel 10 arranged at the back of a liquid crystal display element 1, having light polarizng plates 5 and 6 a first light diffusing means 31 arranged between the back face of the liquid crystal display element 1 and the front face of the illumination panel 10, and a second light diffusing means 32 arranged at the front of the liquid crystal display element 1. Other basic structure of the display device is the same as that of the first embodiment, and their effects and advantages are also the same. Thus, the same reference numbers are attached to the figure and overlapping explanation is omitted.

Figure 11:
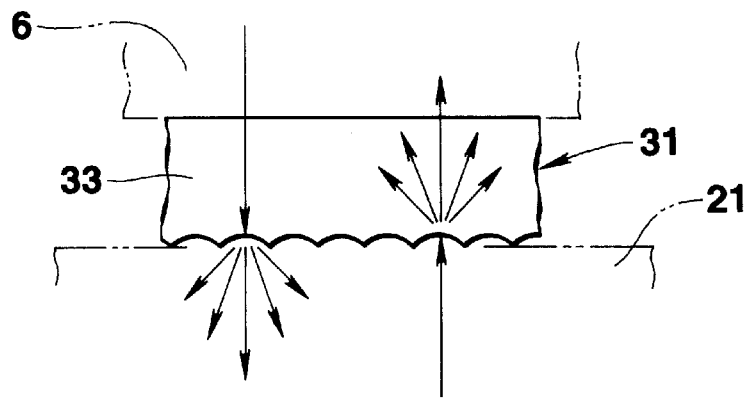
FIG. 11 is an enlarged cross section of a light diffusing means used in the display device according to the third embodiment.

FIG. 11 is an enlarged cross section illustrating a first example of the first light diffusing means 31, wherein hatching is omitted. This light diffusing means 31 is composed of a roughened film 33 wherein one face of a plate or film-like substrate made of an inorganic material having transparency such as alumina or an organic material such as a high molecular material is regularly roughened so that fine unevenness portions having substantially the same sectional shapes are arranged at a substantially uniform pitch. The pitch of the unevenness portions are set to a value that is far smaller than the area of the pixel portion of the liquid crystal display element 1.

Figure 12:
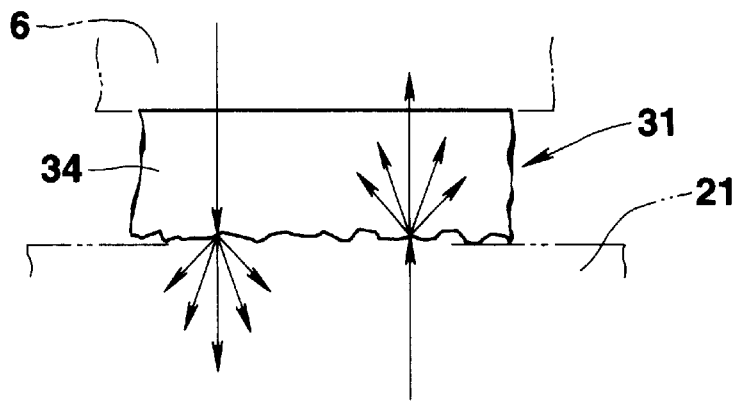
FIG. 12 is an enlarged cross section of another light diffusing means used in the display device according to the third embodiment.

FIG. 12 is an enlarged cross section illustrating a second example of the first light diffusing means 31, wherein hatching is omitted. This light diffusing means 31 is composed of a roughened film 34 wherein one face of a plate or film-like substrate made of an inorganic material having transparency or an organic material is roughened into irregular unevenness shapes that are smaller than the unevenness portions of the roughened film 33 shown in FIG. 11.

Roughening of the roughened films 33 and 34 shown in FIGS. 11 and 12 is realized by rubbing or sandblasting treatment of their film faces, or by roughening the molding surface of a mold.

Both of the roughened films 33 and 34 shown in FIGS. 11 and 12 are films for refracting the light incident from their faces which are roughened (which will be referred to as roughened faces) and the light incident from their other flat faces by the interface between the roughened faces and the air layer in the space opposite to the front face of the optical film 21 or the transparent adhesive agent so as to be scattered. The light incident on either one of the faces becomes scattered light to be emitted from the other face.

In the case wherein any one of the roughened films 33 and 34 is used as the light diffusing means 31, it is desirable that this light diffusing means 31 is unitedly fitted onto the outer face of a back side light-polarizing plate 6 by bonding the flat face opposite to the roughened face onto the outer face of the back side light-polarizing plate 6 of the liquid crystal display element 1 or forming the light diffusing means 31 onto the outer faces of the light-polarizing plate 6.

In this case, the roughened face of the light diffusing means 31 is opposed to the front face of the optical film 21 in the lighting means 10 so that the tips of the respective unevenness portions of the roughened face approach or contact the front face of the optical film 21. Thus, the roughened face of this light diffusing means 31 is opposed to the front face of the optical film 21 through the air layer. Alternatively, the roughened face of the light diffusing means 31 is bonded to the front face of the optical film 21 by a transparent adhesive agent having a refractive index that is far smaller than that of the light diffusing means 31.

Even in the case wherein the roughened face of the light diffusing means 31 is bonded to the front face of the optical film 21 by the transparent adhesive agent, it is possible to refract and diffuse light on the interface the roughened face of the light scattering means 31 and the adhesive agent if the refractive index of the adhesive agent is far smaller than that of the light diffusing means 31.

Figure 13:
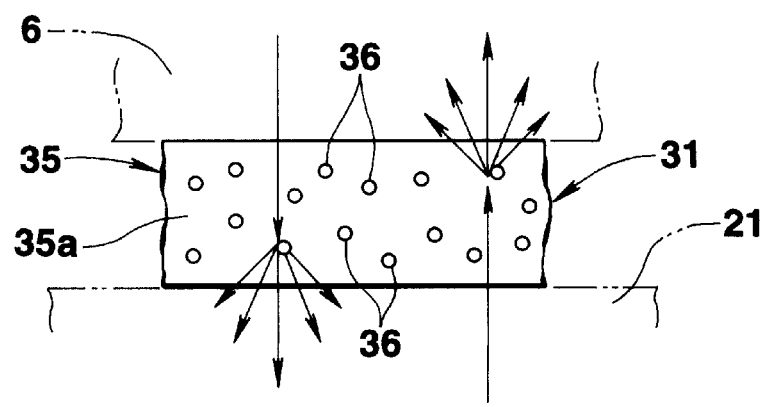
FIG. 13 is an enlarged cross section of still another light diffusing means used in the display device according to the third embodiment.

FIG. 13 is an enlarged cross section illustrating a third example of the first light diffusing means 31, wherein hatching is omitted. This light diffusing means 31 is composed of a scattering material 33a to incorporated film 35 wherein a scattering material 36 having a refractive index different from that of a base material is substantially uniformly dispersed into the base material 35a made of an inorganic material having transparency (for example, alumina) or an organic material (for example, a high molecular material). The scattering material 36 is desirably a material that has a diameter that is far smaller than the area of the pixel portion of the liquid crystal display element 1.

The scattering material 36 is gas particles or particles made of an organic or inorganic material having an refractive index different from the base material 35a. The air particles are produced by incorporating nitrogen, oxygen or a foaming agent into the base material 35a at the time of forming the scattering material incorporated film 35.

As particles other than the gas particles, there is used, for example, an inorganic pigment such as barium sulfate, mica, titanium or bismuth oxy chloride, or an organic material such as fluoroethylene or acrylic.

The scattering light incorporating film 35 wherein these particles are the scattering material 36 is formed by incorporating the particles into the base material 35a at the time of forming the film. A single sort or mixed sorts of the particles incorporated into the base material 35a may be used.

The scattering material incorporated film 35 is a film for scattering and diffusing respective light incident from one face and the other face thereof by the scattering material 36 as shown by illustrated arrows. Light incident from either face becomes scattered light to be emitted from the other face.

FIGS. 14A to 14C illustrate examples of light diffused by the scattering material 36. When the scattering material 36 is transparent particles having a refractive index different from the gas particles or the base material 35a, light is refracted on the interface between the circumferential face of the scattering material 36 and the base material 35a as shown in FIG. 14A and this is repeated so that transmitted light is diffused.

When the scattering material 36 is particles having light scattering ability, light is scattered in the scattering material 36 as shown in FIG. 14B. This is repeated so that the transmitted light is diffused.

When the scattering material 36 is particles having light reflection ability, light is scattered and reflected on the circumferential face of the scattering material 36c as shown in FIG. 14C, and this is repeated so that transmitted light is diffused.

In the case wherein the light diffusing means 31 made of the scattering material incorporated film 35 is used, it is desirable that this light diffusing means 31 is unitedly fitted onto the outer face of the light-polarzing plate 6 by bonding one face of the means 31 onto the outer face of the back side light-polarizing plate 6 of the liquid crystal display element 1 or forming the light scattering means 31 on the outer face of the light-polarizing plate 6, and that the other face of this light scattering means 31 is opposed to the front face of the optical film 21 in the lighting means 10 so as to be bonded on the front face of the optical film 21 through the transparent adhesive agent.

It is preferred that the used adhesive agent is Ad such an adhesive agent that difference from the base material 35a of the scattering material incorporated film 35 and the optical film 21 in their refractive indexes is as small as possible. As a result, it is possible to remove almost all of refraction and reflection of light on the interface between the adhesive agent and the light diffusing means 31 and the interface between the adhesive agent and the optical film 21, and project light efficiently from one of the light diffusing means 31 and the optical film 21 to the other.

FIG. 15 is an enlarged cross section illustrating a fourth example of the first light diffusing means 31, wherein hatching is omitted. This light diffusing means 31 is a means wherein respective transparent adhesive agents 37a and 37b are applied to both faces of the scattering material incorporated film 35 shown in FIG. 13.

This light diffusing means 31 is unitedly fitted onto the outer face of the light-polarizing plate 6 by sticking one face of the means 31 onto the outer face of the back side light-polarizing plate 6 of the liquid crystal display element 1 through the adhesive agent 37a on the one face. The other face is stuck onto the front face of the optical film 21 in the lighting means 10 through the adhesive agent 37b on the other face.

In this example, it is preferred that the used adhesive agent 37b on the face which is stuck onto the optical film 21 of the light diffusing means 31 is likewise an adhesive agent that difference from the base material 35a of the scattering material incorporated film 35 and the optical film 21 in their refractive indexes is as small as possible.

It is preferred that the used adhesive agent 37a on the face which is stuck onto the light-polarizing plate 6 of the light diffusing means 31 is an adhesive agent that difference from the base material 35a of the scattering material incorporated film 35 and the light-polarizing plate 6 in their refractive indexes is as small as possible. In this way, it is possible to remove almost all of refraction and reflection of light on the interface between the adhesive agent and the light diffusing means 31 and the interface between the adhesive agent and the light-polarizing plate 6 and project light efficiently from one of the scattering material incorporated film 35 and the light-polarizing plate 6 to the other.

In the light diffusing means of this example, the transparent adhesive agents 37a and 37b are applied onto both faces of the scattering material incorporated film 35. Instead of it, however, the base material 35a of the scattering material incorporated film 35 may be an adhesive resin. In this case, the scattering material incorporated film 35 may directly be stuck onto the outer face of the back side light-polarizing plate 6 and the front face of the optical film 21 by the adhesive ability of the film 35.

FIG. 16 is a partial plane view illustrating a fifth example of the first light diffusing means 31. This light diffusing means is made of a porous film 38.

This porous film 38 is a film wherein a large number of pores 38a are substantially uniformly distributed into a base material of an inorganic material having transparency (for example, alumina) or an organic material (for example, a resin). In the figure, the pores 38a are illustrated spherically. These pores 38 however have various shapes, for example, pores of a sponge.

The porous film 38 is a film for scattering and diffusing respective light incident from one face and the other face thereof on the interface between the base material and the pores 38a. Light incident from either one of the faces becomes scattered light to be emitted from the other face.

Figure 17:
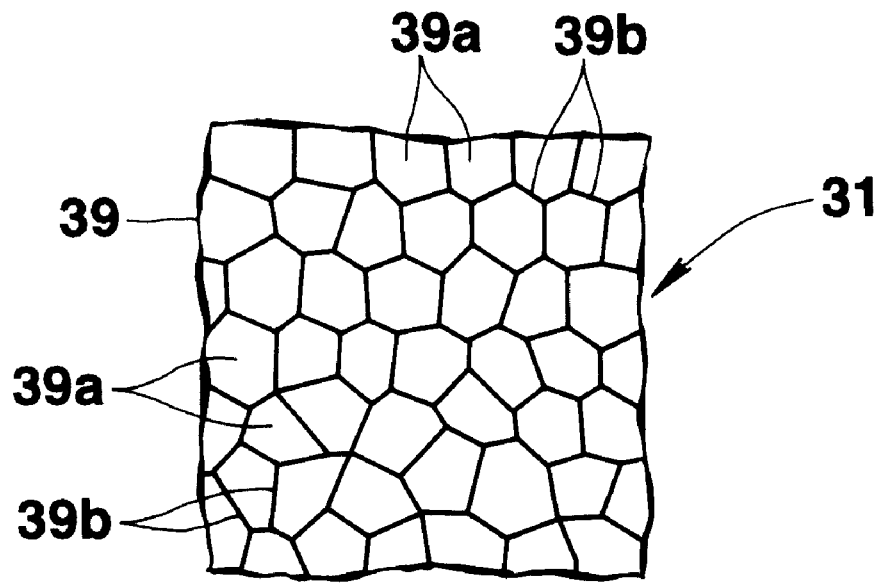
FIG. 17 is an enlarged plane view of a further different light diffusing means used in the display device according to the third embodiment.

FIG. 17 is a partial plane view illustrating a sixth example of the first light diffusing means. This light diffusing means 31 is made of a polycrystallized material film 39 having crystalloid boundary faces 39b.

This polycrystallized material film 39 is a film resulting from polycrystallizing alumina ceramics or high molecular particles such as fluoroethylene powder by pressing and heat-condensing. Light is refracted on the crystalloid boundary faces 39b of respective cores 39a.

That is, this polycrystallized material film 39 is a film for refracting and diffusing respective light incident from one face and the other face thereof on the crystalloid boundary faces 39b of the cores 39a. Light incident from either one of the faces becomes scattered light to be emitted from the other face.

Figure 18:
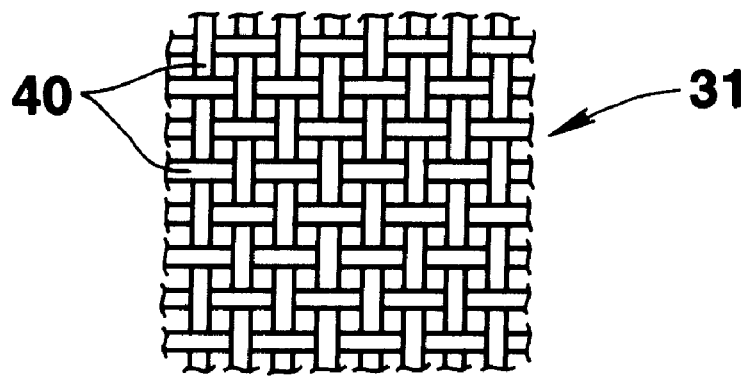
FIG. 18 is an enlarged cross section of a further different light diffusing means 31 used in the display device according to the third embodiment.
Figure 19:
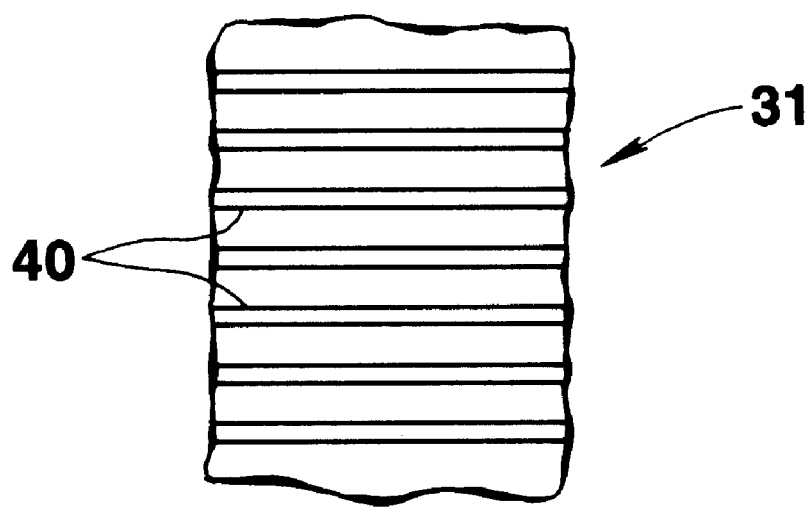
FIG. 19 is an enlarged plane view of a further different light diffusing means 31 used in the display device according to the third embodiment.
Figure 20:
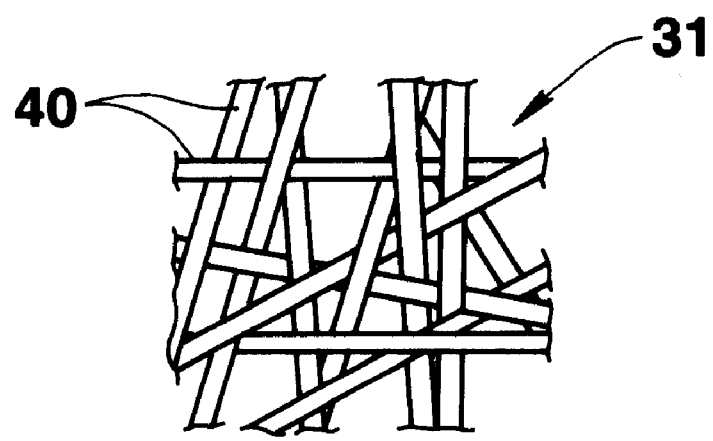
FIG. 20 is an enlarged plane view of a further different light diffusing means used in the display device according to the third embodiment.

FIGS. 18, 19 and 20 are partial plane views illustrating seventh examples of the first optical diffusing means. These light diffusing means 31 are composed of light scattering fibers 40.

The light scattering fibers 40 are any ones of inorganic fibers represented by glass fibers, metallic fibers such as aluminum fibers, carbonized high molecular compound fibers such as acrylic fibers, natural fibers such as cellulose, and semi-synthetic fibers. The light scattering means 31 is composed of the light scattering fibers 40 in a woven cloth or net form as in FIG. 18, the fibers 40 contained in a base material or arranged in parallel as in FIG. 19, or the fibers 40 in a nonwoven cloth (fibers not woven) form. In these, the size of the net or between the fibers is set to a value smaller than the pixel portion of the liquid crystal display element 1.

This light diffusing means 31 made of the light scattering fibers 40 is a means for refracting or reflecting respective light incident from one side and the other face thereof on the circumferential faces of the light scattering fibers 40 and scattering the light inside the fibers 40 so as to be diffused. Light incident from either one of the faces becomes scattered light to be emitted from the other face.

In the case wherein the light diffusing means 31 made of the porous film 38, the polycrystallized material film 39 or the light scattering fiber 40 is used, as shown in FIGS. 16 to 20, it is desired that this light diffusing means 31 is unitedly fitted onto the outer face of the light-polarizing plate 6 by sticking one face of the means 31 onto the outer face of the back side light-polarizing plate 6 of the liquid crystal display element 1 or forming the light diffusing means 31 onto the outer face of the light-polarizing plate 6, and that the other face of the light diffusing means 31 is opposed onto the front face of the optical film 21 in the lighting means 10 and stuck on the front face of the of the optical film 21 through a transparent adhesive agent 37b.

The second light diffusing means 32 arranged at the front of the liquid crystal display element 1 is any one diffusing means of the aforementioned roughened films 33 and 34, the scattering material incorporated film 35, the porous film 38, the polycrystallized material film 39 and the light scattering fibers 40.

It is also desired that this second light diffusing means 32 is unitedly fitted onto the outer face of the light-polarizing plate 5 by sticking one face of the means 32 (the flat face opposite to the roughened face in the case of the roughened films 33 and 34 shown in FIGS. 11 and 12) onto the outer face of the front side light-polarizing plate 5 or forming the light diffusing means 32 on the outer face of the light-polarizing plate 5.

In the aforementioned display device, when sufficiently bright outer light is obtained, reflection type display using the outer light is carried out. When sufficiently bright outer light is not obtained, the light source section 14 of the lighting means 10 is switched on to carry out transmission type display using light source light. When the light source light is used, the light emitted from the lighting means 10 is projected into the liquid crystal display element 1 from its back face side and the light is transmitted through the liquid crystal display element 1 to be emitted ahead.

Also, when outer light is used, the outer light incident from the front of the liquid crystal display element 1 is transmitted through the liquid crystal display element 1 and reflected on the lighting means 10 behind it, and then the reflected light is again transmitted through the liquid crystal display element 1 to be emitted ahead.

First, display using light from the lighting means 10 will be described. When this lighting means 10 is used, the light source section 14 of the lighting means 10 is switched on.

The light from this light source section 14 is taken in the photoconductor 11 from its incident end face 11a, and then is introduced into this photoconductor 11 to be emitted from the step differentiating faces 12b of the stepwise face 12 as shown paths drawn by solid lines in FIG. 10.

Each of the light rays emitted from the step differentiating faces 12b of the photoconductor 11 is projected into any one of the incident portions 22, in a projection form, formed on the back face of the optical film 21. That is, the respective step differentiating faces 12b of the photoconductor 11 necessarily correspond to at least one of the incident portions 22 of the optical film 21. Accordingly, almost all of the light emitted from the respective step differentiating faces 12b of the photoconductor 11 does not become loss light and is projected into in any one of the incident portions 22 of the optical film 21.

Among the light emitted from the step differentiating faces 12b of the photoconductor 11, there is light emitted toward the next step face 12a, as shown in FIG. 10. However, the light is reflected on the reflective film 13 on the next step face 12a to be projected into the incident portions 22 of the optical film 21.

The light rays incident on the incident portions 22 are taken in the incident portions 22 from the incident faces 22a of the incident portions 22, totally reflected on the opposite refractive faces 22b and refracted ahead (toward the front face of the optical film 21) to be emitted from the front face of the optical film 21 ahead.

That is, the optical film 21 has the front face for emitting light, and the back face having the incident portions, in a projection form, having the incident faces 22a for taking light emitted from the step differentiating faces 12b of the photoconductor 11 and the refractive faces 22b for refracting light taken in from the incident faces 22a. Thus, almost all of the light emitted from the step differentiating faces 12b of the stepwise face 12 of the photoconductor 11 can be taken in the optical film 21 without any loss to be projected ahead, and further the emitted light can be made into light having a brightness distribution having directivity that the emitted light is emitted in a given direction at a high brightness.

The following will describe reflection type display using outer light. In this case, the outer light incident from the front of the liquid crystal display element 1 is diffused by the second light diffusing means 32 to be projected into the liquid crystal display element 1 from its front face. This light transmitted through this liquid crystal display element 1 is diffused by the first diffusing means 31 to be projected into the optical film 21 in the lighting means 10 from its front face at various incident angels.

The light incident on the optical film 21 from its front face is guided into the optical film 21, in its thickness direction, as shown by paths drawn by broken lines in FIG. 10 and then emitted from its back face to be reflected on the reflective films 13 formed on the step differentiating faces 12b of the photoconductor 11.

The light emitted from the front face of the optical film 21 ahead, that is, the light resulting from reflection of outer light from the front on the lighting means 10 is diffused by the first light diffusing means 31 to be projected into the liquid crystal display element 1 from its back face. The light transmitted through this liquid crystal display element 1 is diffused by the second light diffusing means 32 to be emitted ahead.

In this manner, the lighting means 10 has a function of not only emitting the light from the light source section 14 ahead but also reflecting the outer light incident from the front to be emitted ahead. When the light source section 14 is switched on to carry out transmission type display, the light from the light source section 14 is taken in the photoconductor 11 from its incident end face 11a and emitted from the step differentiating faces 12b of the stepwise face 12, and the light is taken in the optical film 21 to be emitted from the front face of the optical film 21 ahead.

When reflection type display using outer light is carried out, the outer light that is projected from the front of the liquid crystal display element 1, transmitted from this liquid crystal display element 1 and projected into the lighting means 10 behind it is transmitted through the optical film 21, reflected on the reflective films 13 on the step faces 12a of the stepwise face 12 of the photoconductor 11. The reflected light is transmitted through the optical film 21 to be emitted from its front face ahead.

Therefore, almost all of the light taken in the photoconductor 11 from the light source section 14 is emitted from the step differentiating faces 12b of the stepwise face 12 of this photoconductor 11, and then the light is taken in the optical film 21 and emitted from its front face ahead. Besides, almost all of the outer light incident from the front is transmitted through the optical film 21 and then reflected on the reflective film 13 formed on the step differentiating faces 12b of the stepwise face 12 of the photoconductor 11. The reflected light is transmitted through the optical film 21 to be emitted ahead. Accordingly, at both the time of emitting light from the light source section 14 and of reflecting outer light incident from the front. The lighting means 10 causes the light to be effectively emitted ahead.

The aforementioned display device has the light diffusing means 31 and 32 between the back face of the liquid crystal display element 1 and the front face of the lighting means 10 and on the front face of the liquid crystal display element 1, respectively. It is therefore possible to widen the area for taking in outer light, make reflection type display using outer light brighter, and widen visual field angles for both display of the reflection type display using outer light and transmission type display using light source light.

That is, outer light is projected from the front of the liquid crystal display element 1 at various angles. If the light diffusing means 32 is arranged at the front of the liquid crystal display element 1, it is also possible to diffuse the outer light incident from the direction which is greatly inclined toward the direction perpendicular to the front face of the liquid crystal display element 1, as shown by paths drawn by broken lines in FIG. 10, by the light diffusing means 32 and take in the light.

Therefore, the area for taking in outer light can be widened so that the amount of taking the outer light becomes larger. The brightness of the light reflected on the lighting means 10 can also be made higher. Therefore, reflection type display using the outer light can be made brighter.

Besides, when the outer light incident from the liquid crystal display element 1 is projected into the liquid crystal display element 1 from its front face as shown by paths drawn by broken lines in FIG. 10, the outer light is diffused by the light diffusing means 32. The light is diffused by the light diffusing means 31 arranged between the back face of the liquid crystal display element 1 and the front face of the lighting means 10 when the light is transmitted through the liquid crystal display element 1 and projected into the lighting means 10 behind it. In addition, in the step of reflecting the light on the lighting means 10, transmitting the light through the liquid crystal display element 1 and emitting the light ahead, the light is also diffused by the light diffusing means 31 and 32. Thus, it is possible to widen the visual field angle for reflection type display using outer light.

In transmission type display using light source light, the light emitted from the lighting means 10 is diffused by the light diffusing means 31 arranged between the back face of the liquid crystal display element 1 and the front face of the lighting means 10, as shown by paths drawn by solid lines in FIG. 10. When the light is further transmitted through the liquid crystal display element 1 to be emitted toward its front face, the light is diffused by the light diffusing means 32 arranged on the front face of the liquid crystal display element 1. For this reason, it is possible to widen sufficiently the visual filed angle for the transmission type display using light source light.

In the aforementioned embodiment, as the light diffusing means 31 and 32, there are used the roughened films 33 and 34 shown in FIGS. 11 and 12, the scattering material incorporated film 35 shown in FIGS. 13 and 15, the porous film 38 shown in FIG. 16, the polycrystallized material film 39 shown in FIG. 17, or the light scattering fibers 40 shown in FIGS. 18 and 19. Thus, good light diffusing effect can be obtained.

Furthermore, in the aforementioned display device, the light diffusing means 31 and 32 are arranged between the back face of the liquid crystal display element 1 and the front face of the lighting means 10 and on the front face of the liquid crystal display element 1, respectively. Therefore, even if means having a relatively small haze value are used as these light diffusing means 31 and 32, sufficiently wide visual field angles can be obtained.

The haze value is a cloudy value of light diffusing means, which is represented by (a scattered light transmissivity)/(whole ray transmissivity)×100. The haze value of the one of the light diffusing means 31 and 32 and that of the other are desirably from 10 to 70, respectively.

If the haze values of the light diffusing means 31 and 32 are small, sandy feeling of displayed images caused on light-scattering does not become conspicuous, so that images which is not sandy and has a good image quality can be displayed.

As described above, in the aforementioned embodiment, the first light diffusing means 31 arranged between the back face of the liquid crystal display element 1 and the front face of the lighting means 10 is unitedly fitted onto the outer face of the back side light-polarizing plate 6 of the liquid crystal display element 1, and the second light diffusing means 32 arranged at the front of the light diffusing means 1 is unitedly fitted onto the outer face of the front side light-polarizing plate 5 of the liquid crystal display element 1. For this reason, it is possible to make the structure of the display device simpler than the cases wherein the light diffusing means 31 and 32 are made into different members and the light diffusing means 31 and 32 are arranged between the back face of the liquid crystal display element 1 and the front face of the lighting means 10, or at the front of the liquid crystal display element 1.

The first light diffusing means 31 arranged between the back face of the liquid crystal display element 1 and the front face of the lighting means 10 may be unitedly fitted onto the front face of the optical film 21 by sticking one face (the flat face opposite to the roughened films 33 and 34 in the case of the roughened films shown in FIGS. 11 and 12) of the means 31 on the front optical film 21 of the lighting means 10 or by forming the light diffusing means 31 on the front face of the optical film 21, and the other face of this light diffusing means 31 may be opposed to the back side light-polarizing plate 6. In this manner, the structure of the display device can be made simple.

However, the first light diffusing means 31 may be made into a separate member so as to be sandwiched and arranged between the back face (the back face of the back side light-polarizing plate 6) of the liquid crystal display element 1 and the front face of the lighting means 10.

Each of the roughened films 33 and 34 shown in FIGS. 11 and 12 is a film wherein its one face is roughened. Each of the roughened film 33 and 34 may be a film wherein its both faces are roughened.

The second light diffusing means 32 arranged at the front of the liquid crystal display element 1 may be formed by subjecting the front face of the front side light-polarizing plate 5 of the liquid crystal display element 1 to the same treatment as a surface reflection preventing treatment. Moreover, the front face of the front side light-polarizing plate 5 may be subjected to the surface reflection preventing treatment and further the second light diffusing means 32 (any one of the roughened films 33 and 34, the scattering material incorporated film 35, the porous film 38, the polycrystallized material film 39 and light scattering fibers 40) may be arranged on the front face.

In the aforementioned embodiment, the light diffusing means 31 and 32 are arranged between the back face of the liquid crystal display element 1 and the front face of the lighting means 10 and on the front face of the liquid crystal display element 1, respectively. However, either one of these light diffusing means 31 and 32 may be omitted.

In the case wherein either one of the light diffusing means 31 and 32 is omitted in this way, it is desired that haze values of the used light diffusing means are set within the range from 20 to 80. haze values of the light diffusing means are within this range, a visual filed angle for display can be sufficiently widened in either case wherein the light diffusing means 31 is arranged only between the back face of the liquid crystal display element 1 and the front face of the lighting means 10, or wherein the light diffusing means 32 is arranged only on the front face of the liquid crystal display element.

[4th Embodiment]

Figure 21:
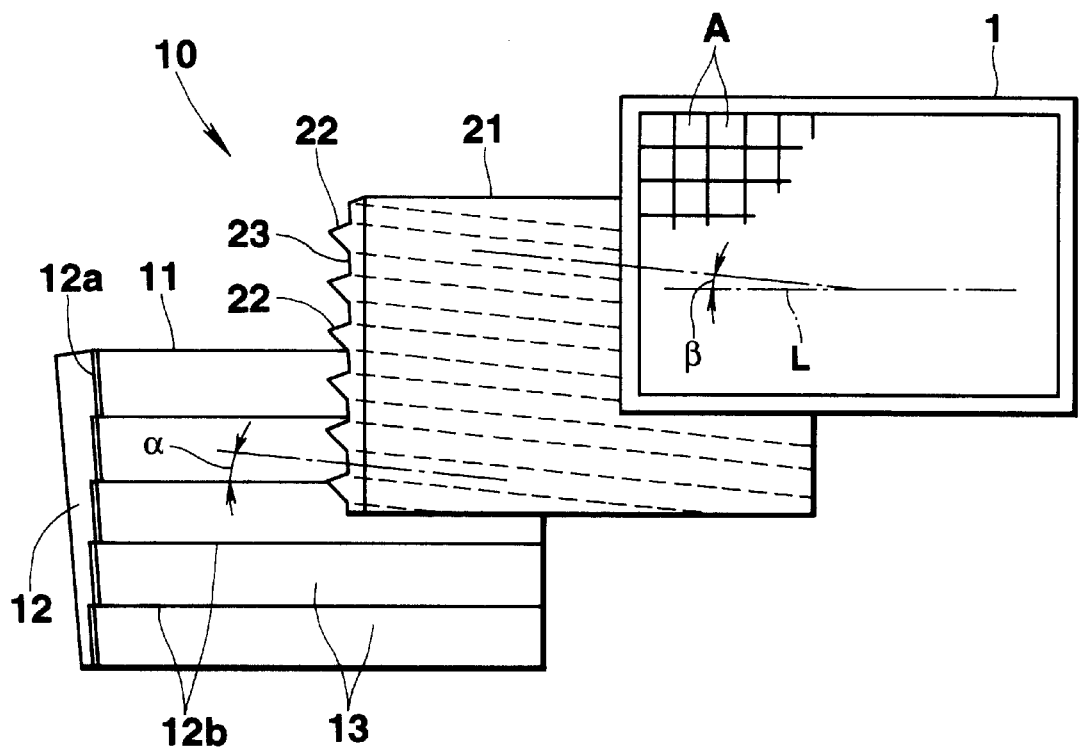
FIG. 21 is a perspective view illustrating a display device according to a fourth embodiment.

FIG. 21 shows a display device of the fourth embodiment of this invention. The display device of this embodiment is a device wherein measures for preventing moire fringes different from the aforementioned embodiments are taken.

Namely, the display device of this embodiment is a device wherein the incident portions 22 formed on the back face of the optical film 21 of the lighting means 10 are arranged along the direction that is oblique from the width direction of this optical film 21 at a given angle and the length direction of the incident portions 22 of this optical film 21 is oblique from the length direction of the step differentiating faces 12b of the photoconductor 11 and the arranging direction L (the direction along the horizontal axial in this example) of the pixel portions A of the liquid crystal display element 1 at given angles α and β, respectively.

The structure of the optical film 21 is the same as that of the optical film used in the first embodiment, except in that its incident portions 22 are obliquely formed. Both of the photoconductor 11 and the liquid crystal display element 1 are the same as those used in the first embodiment. Thus, the same reference numbers are attached to the figure and overlapping explanation is omitted.

The gap angle α between the length direction of the incident portions 22 of the optical film 21 and the length direction of the step differentiating faces 12b of the photoconductor 11 and the gap angle β between the length direction of the incident portions 22 and the arranging direction L of the pixel portions A of the liquid crystal display element 1 are preferably within the ranges of 0 degree<α≦25 degree and 0 degree<β≦25 degrees, respectively. In this embodiment, the gap angles α and β are set as follows: α=12 degrees and β=12 degrees.

According to the display device of this embodiment, the length direction of the step differentiating faces 12b of the photoconductor 11 constituting the lighting means 10 and the length direction of the incident portions 22 of the optical film 21 are obliquely shifted to each other. Therefore, even if the pitch of the incident portions 22 of the optical film 21 is, for example, the same as the pitch of the step differentiating faces 12b of the photoconductor 11, light having no moire fringes can be emitted from the lighting means 10.

In this embodiment, the length direction of the incident portions 22 of the optical film 21 is obliquely shifted to both the length direction of the step differentiating faces 12b of the photoconductor 11 and the arranging direction L of the pixel portions A of the liquid crystal display element 1. However, the following is allowable: only the lighting means 10 is made into a structure wherein the length direction of the step differentiating faces 12b of the photoconductor 11 and the length direction of the incident portions 22 of the optical film 21 are obliquely shifted to each other, and consequently the length direction of the incident portions 22 of the optical film 21 and the arranging direction L of the pixel portions A of the liquid crystal display element 1 are substantially made parallel to each other. Even in this case, light having no moire fringes is emitted from the lighting means 10 so that images having a good image quality can be displayed in the liquid crystal display element 1.

In this case, if the pitch P2 of the incident portions 22 of the optical film 21 is made smaller than the pixel pitch Pa of the liquid crystal display element 1, it is possible to prevent moire fringes from arising in the light that is emitted from the optical film 21, transmitted from the liquid crystal display element 1 and emitted ahead of the element 1.

In contrary to the above, the following is also allowable: the structure wherein the length direction of the incident portions 22 of the optical film 21 and the arranging direction L of the pixel portions A of the liquid crystal display element 1 are obliquely shifted to each other and in the lighting means 10 the length direction of the step differentiating faces 12b of the photoconductor 11 and the length direction of the incident portions 22 of the optical film 21 are made substantially parallel to each other. Even in this case, it is possible to prevent moire fringes from arising in the light that is emitted from the optical film 21, transmitted from the liquid crystal display element 1 and emitted ahead of the element 1. As a result, images having a good image quality can be displayed.

[5th Embodiment]

A photoconductor of the fifth embodiment of this invention is a photoconductor for averaging the brightness distribution of emitted light that is taken in from the incident end face 11a of the photoconductor 11 of the first embodiment, and emitted from the step differentiating faces 12b of the stepwise face 12 ahead.

Figure 22:
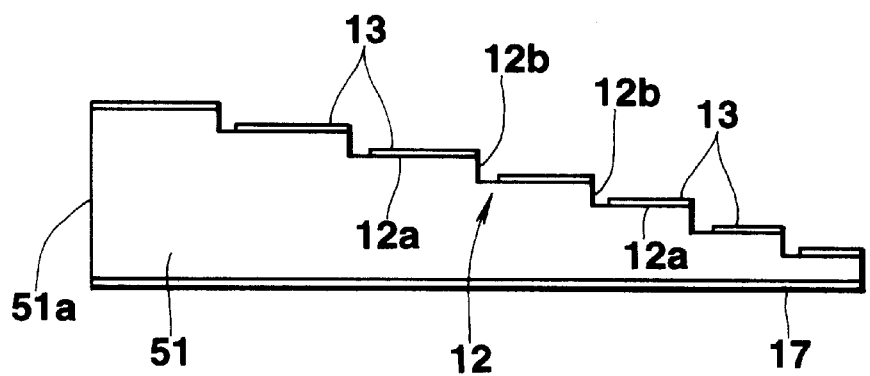
FIG. 22 is a cross section illustrating a photoconductor in an illumination panel according to a fifth embodiment.

In the photoconductor 51 of the fifth embodiment shown in FIG. 22, the pitch of the step differentiating faces 12b of the stepwise face 12 is in sequence made smaller toward the direction that is away from the incident end face 51a.

In the photoconductor of this embodiment, the pitch of the step differentiating faces 12b of the stepwise face 12 of the photoconductor 51 is different, but other structure thereof is the same as that of the first embodiment. Thus, the same reference numbers are attached to the figure and overlapping explanation is omitted.

That is, as the light taken in the photoconductor 51 from its incident end face 51a is transmitted toward the other end direction inside the photoconductor 51, its intensity decreases. However, as the light goes nearer to the other end direction, the step differentiating faces 12b increase so that the faces for emitting light increase. Thus, the brightness distribution of the emitted light that is emitted toward the front face can be averaged independently on the distance from the incident end face 51a.

[6th Embodiment]

Figure 23:
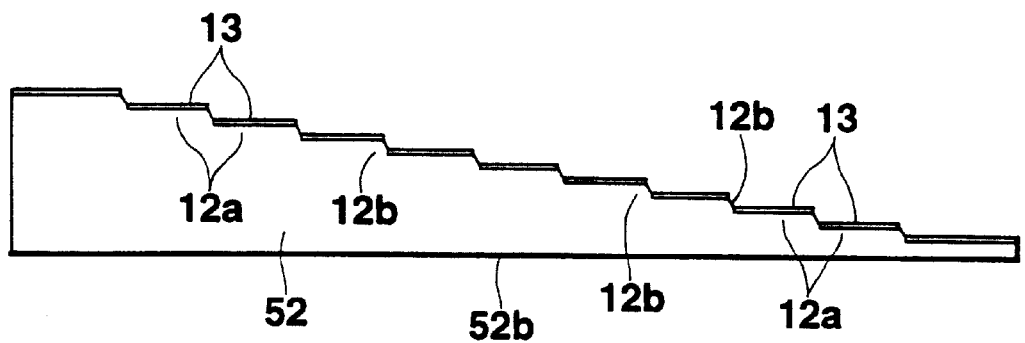
FIG. 23 is a cross section illustrating a photoconductor in an illumination panel according to a sixth embodiment.
Figure 24:
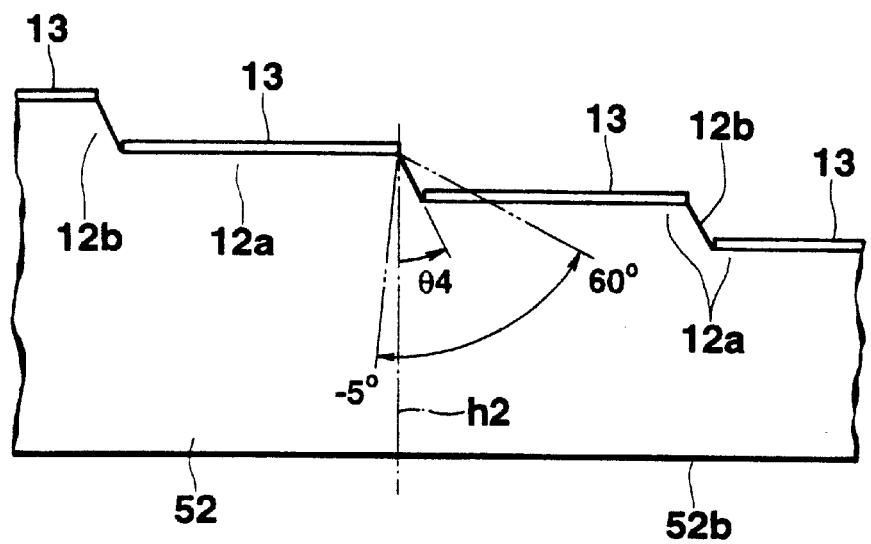
FIG. 24 is an enlarged cross section of FIG. 23.

A photoconductor 52 of the sixth embodiment shown in FIGS. 23 and 24 is a photoconductor wherein the stepwise face 12 at the front of the photoconductor 52 is formed into the shape that the step faces 12a are substantially parallel to the back face 52b of the photoconductor 52 and further the step differentiating faces 12b are inclined at a given angle θ4 to the normal h2 of the back face 52b of the photoconductor.

In this photoconductor 52 of this embodiment, the shape of its stepwise face 12 is different, but other structure thereof is the same as that of the first embodiment. Thus, the same reference numbers are attached to the figure and overlapping explanation is omitted.

According to this photoconductor 52, it is possible to make the area of the step differentiating faces 12b wider, emit a larger quantity of light from the step differentiating faces 12b and thus make its intensity higher than the case wherein reflective faces substantially parallel to the back face 52b of the photoconductor 52 are made by the reflective films 13 deposited on the step faces 12a and further, as in the first embodiment, the step differentiating faces 12b are formed perpendicularly to the back face 52b of the photoconductor.

In the case wherein the step differentiating faces 12b are made into oblique faces in this way, the inclination angle θ4 of the step differentiating faces 12b to the normal h2 of the back face 52b of the photoconductor 52 is preferably within the range from −5 degrees to 60 degrees and more preferably within the range from 25 degrees to 30 degrees (θ4=about 27 degrees in FIG. 24) when the direction that the angle between the step faces 12a and the step differentiating faces 12b becomes larger is set to a positive angle and the direction that the angle between the step faces 12a and the step differentiating faces 12b becomes smaller is set to a negative angle. By setting the inclination angle θ4 of the step differentiating faces 12b in this way, the light that is guided in the photoconductor 52 and emitted from the step differentiating faces 12b can be emitted efficiently without being totally reflected on the step differentiating faces 12b.

[7th Embodiment]

Figure 25:
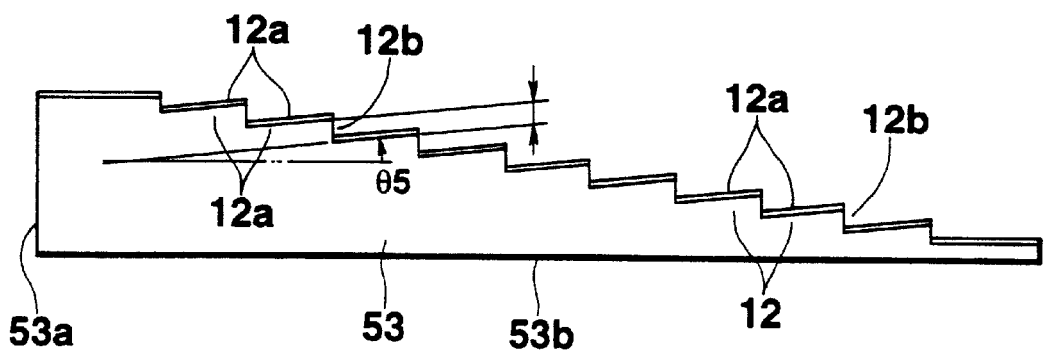
FIG. 25 is a cross section illustrating a photoconductor in an illumination panel according to a seventh embodiment.

In a photoconductor 53 of the seventh embodiment shown in FIG. 25, the stepwise face 12 of the front of the photoconductor 53 is formed in such a manner that the step faces 12a between the respective step differentiating faces 12b are inclined in such a direction that the interval between the step faces 12a and the back face 53b becomes wider in the end portion remote from the incident end face 53a of the photoconductor 53 rather than the end portion near the incident end face 53a.

Furthermore, the step differentiating faces 12b are formed into the shape that the faces 12b are substantially perpendicular to the back face 53b of the photoconductor 53.

In the photoconductor 53 of this embodiment, the shape of its stepwise face 12 is different, but other structure thereof is the same as that of the first embodiment. Thus, the same reference numbers are attached to the figure and overlapping explanation is omitted.

According to this photoconductor 53, the step faces 12a between the respective step differentiating faces 12b are inclined in such a direction that the interval between the step faces 12a and the back face 53b becomes wider in the end portion remote from the incident end face 53a of the photoconductor rather than the end portion near the incident end face 53a, and consequently it is possible to make the area of the step differentiating faces 12b larger, emit a larger quantity of light from the step differentiating faces and thus make its intensity higher than the case wherein the step differentiating faces 12b are formed in parallel to the photoconductor back face as in the first embodiment.

The step differentiating faces 12b are substantially perpendicular to the photoconductor back face 53b. Therefore, when the photoconductor 53 is viewed from the front, the step differentiating faces 12b can hardly be seen, thereby making it possible to cause the photoconductor 53 to have a reflection characteristic similar to that of a reflective plate in a flatter plate form.

In the case wherein the step differentiating faces 12b are made into inclined faces in this way, the inclination angle θ5 of the step differentiating faces 12b to the back face 53b of the photoconductor 53 is desirably 10 degrees or less. If the inclination angle θ5 of the step differentiating faces 12b is within such a range, outer light incident from the front can be reflected ahead on the reflective films 13 deposited on the step faces 12a.

It is possible to increase the area for emitting light source light incident from the incident end face 53a of the photoconductor 53 by inclining the step differentiating faces 12b from the normal of the photoconductor back face 53b.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination panel comprising:

a light source;

a photoconductor including an incident end face in that takes light from the light source, and a front face having emitting faces which are arranged at intervals and oppositely to the incident end face, said emitting faces guiding light incident thereon from the incident end face to be directly emitted as illumination light in a first predetermined direction, and said front face also having reflective faces each of which is arranged between respective adjacent ones of the emitting faces, said reflective faces reflecting external light incident on the front face from outside of the photoconductor; and an optical film arranged on a side of the front face of the photoconductor to emit the illumination light emitted from the emitting faces of the photoconductor in a second predetermined direction which differs from the first predetermined direction, and to emit the external light that is reflected by said reflective faces of the photoconductor in a third predetermined direction which is substantially equal to the second predetermined direction.

2. The illumination panel according to claim 1, wherein the front face of the photoconductor is formed in a stepwise shape and comprises step faces on which the reflective faces are formed, and step differentiating faces which connect respective adjacent ones of the step faces and which emit the light incident from the incident end face, said step differentiating faces constituting the emitting faces.

3. The illumination panel according to claim 2, wherein the optical film comprises a flat front face that emits light in the second predetermined direction, and a back face having at least one projecting incident portion, said at least one projecting incident portion comprising an incident face that takes in the light emitted from the step differentiating faces of the photoconductor and a refractive face that one of reflects and refracts the light that is taken in from the incident face in the third predetermined direction which is substantially equal to the second predetermined direction.

4. The illumination panel according to claim 3, wherein the incident face of said at least one projecting incident portion of the optical film is arranged so as to be inclined at an angle of 5 to 15 degrees with respect to a line perpendicular to the front faces, and the refractive face of said at least one projecting incident portion of the optical film is arranged so as to be inclined at an angle of 20 to 50 degrees with respect to the line perpendicular to the front face.

5. The illumination panel according to claim 3, wherein the refractive face of the optical film comprises a light-concentrating refractive face in a curved form.

6. The illumination panel according to claim 3, wherein said at least one projecting incident portion comprises a plurality of protecting portions that are arranged at intervals along another face having an inclination different from the inclinations of the incident face and the refractive face, said another face being provided between adjacent ones of the projecting incident portions and forming an incident/emitting face which emits light incident on the optical film from the front face toward the step face of the photoconductor and onto which light reflected on the reflective faces of the step faces of the photoconductor is projected.

7. The illumination panel according to claim 3, wherein the step faces of the photoconductor and the projecting incident portions of the optical film are arranged at different pitches.

8. The illumination panel according to claim 3, further comprising a reflective plane plate disposed at a back side of the photoconductor.

9. The illumination panel according to claim 1, wherein the front face of the photoconductor is formed in a stepwise shape and comprises step differentiating faces which have a constant pitch and substantially a same height, and step faces which are respectively positioned between adjacent ones of the differentiating faces.

10. The illumination panel according to claim 9, wherein the photoconductor comprises a flat back face, the step faces are parallel to each other, and the step differentiating faces are parallel to each other.

11. The illumination panel according to claim 10, wherein the step faces are substantially parallel to the flat back face of the photoconductor, and the step differentiating faces are substantially perpendicular to the flat back face of the photoconductor.

12. The illumination panel according to claim 10, wherein the step faces are substantially parallel to the flat back face of the photoconductor, and the step differentiating faces are inclined at a given angle to a line perpendicular to the flat back face of the photoconductor.

13. The illumination panel according to clam 10, wherein the step faces are inclined at angles to the flat back face of the photoconductor in such a manner that a distance between the step faces and the flat back face becomes longer from base ends of the step faces to front ends thereof, and the step differentiating faces are substantially perpendicular to the flat back face of the photoconductor.

14. The illumination panel according to claim 10, wherein the step faces are inclined at angles to the flat back face of the photoconductor in such a manner that a distance between the step faces and the flat back face becomes longer from base ends of the step faces to front ends thereof, and the step differentiating faces are inclined at a given angle to a line perpendicular to the flat back face of the photoconductor.

15. The illumination panel according to claim 14, wherein the inclination angle of the step differentiating faces is within a range from −5 degrees to 60 degrees when a direction that an angle between the step faces and a direction that an angle between the step differentiating faces becomes larger is set to a positive angle, and a direction that the angle between the step faces and the step differentiating faces becomes smaller is set to a negative angle.

16. The illumination panel according to claim 14, wherein the inclination angle of the step faces to the flat back face of the photoconductor is 10 degrees or less.

17. The illumination panel according to claim 10, wherein the incident end face of the photoconductor is inclined at a given angle to a line perpendicular to the flat back face of the photoconductor.

18. The illumination panel according to claim 10, wherein the inclination angle of the incident end face to a line perpendicular to the flat back face of the photoconductor is 60 degrees or less.

19. A photoconductor comprising an incident end face that takes in light from a light source, and a front face having emitting faces which are arranged at intervals and oppositely to the incident face, said emitting faces guiding light incident thereon from the incident end face to be directly emitted as illumination light in a first predetermined direction, and said front face also having reflective faces each of which is arranged between respective adjacent ones of the emitting faces, said reflective faces reflecting external light incident on the front face from outside of the photoconductor.

20. The photoconductor according to claim 19, wherein the front face of the photoconductor is formed in a stepwise shape and comprises step faces on which the reflective faces are formed, and step differentiating faces which connect respective adjacent ones of the step faces and which emit the light incident from the incident end face, said step differentiating faces constituting the emitting faces.

21. The photoconductor according to claim 19, wherein said photoconductor comprises a photoconductor body formed in a stepwise shape, said photoconductor body including step faces and step differentiating faces which connect respective adjacent ones of the step faces to each other and which emit the light incident from the incident end face, and wherein reflective films are formed on the step faces, and the reflective faces comprise the step faces and the reflective films.

22. The photoconductor according to claim 21, wherein an undercoat film having a high adhesion is provided on both of the photoconductor body and the reflective films on the step faces, with the reflective films being formed on the undercoat film.

23. The photoconductor according to claim 21, wherein a transparent overcoat film is disposed on the reflective films.

24. A display device comprising:
a light source; and
a photoconductor including an incident end face that takes in light from the light source, and a front face having emitting faces which are arranged at intervals and oppositely to the incident end face, said emitting faces guiding light incident thereon from the incident end face to be directly emitted as illumination light in a first predetermined direction, and said front face also having reflective faces each of which is arranged between respective adjacent ones of the emitting faces, said reflective faces reflecting external light incident on the front face from outside of the photoconductor; and
an optical film arranged on a side of the front face of the photoconductor and having a front face and a back face, said optical film emitting the illumination light emitted from the emitting faces of the photoconductor from the front face thereof in a second predetermined direction which differs from the first predetermined direction and emitting the external light that is reflected by said reflective faces of the photoconductor from the front face thereof in a third predetermined direction which is substantially equal to the second predetermined direction; and a transmission type display that controls transmission of light, said transmission type display being arranged at a side of the front face of the optical film.

25. The display device according to claim 24, wherein the front face of the photoconductor is formed in a stepwise shape and comprises step faces on which the reflective faces are formed, and step differentiating faces which connect respective adjacent ones of the step faces and which emit the light incident from the incident end face, said step differentiating faces constituting the emitting faces.

26. The display device according to claim 25, wherein the back face of the optical film comprises incident portions, in a projection form, each having an incident face that takes in light emitted from a respective one of the step differentiating faces of the photoconductor and a refractive face that refracts light taken in by the incident.

27. The display device according to claim 26, wherein an angle between the incident face of the incident portions and a line perpendicular to the front face of the optical film is within a range from 5 to 15 degrees, and an angle between the incident/emitting faces and a line perpendicular to the front face of the optical film is within a range from 70 to 90 degrees.

28. The display device according to claim 26, wherein the refractive face of the incident portions of the optical film is an inclination face which is inclined at a given angle to a line perpendicular to the front face of the optical film.

29. The display device according to claim 28, wherein an angle between the refractive face and a line perpendicular to the front face of the optical film is within a range from 30 to 50 degrees.

30. The display device according to claim 26, wherein the refractive face of the incident portions of the optical film comprises a curved light-concentrating face.

31. The display device according to claim 24, wherein a light diffusing element is arranged at least one of between the back face of the transmission type display and a front face of the light source and at a front of the transmission type display.

32. The display device according to claim 31, wherein the transmission type display comprises a liquid crystal display element having a light-polarizing plate on an outer surface thereof, and the light diffusing element is integrally fitted onto an outer face of the light-polarizing plate.

33. The display device according to claim 31, wherein the light diffusing element is integrally fitted onto the front face of the light source.

34. The display device according to claim 31, wherein light diffusing elements are respectively arranged at the front of the transmission type display and between the back face of the transmission type display and the front face of the light source.

35. The display device according to claim 31, wherein the light diffusing element comprises a roughened film having at least one is roughened face.

36. The display device according to claim 31, wherein the light diffusing element comprises a scattering material incorporated film having a scattering material dispersed into a base material.

37. The display device according to claim 31, wherein the light diffusing element comprises a porous film.

38. The display device according to claim 31, wherein the light diffusing element comprises a poly-crystallized material film having boundary faces.

39. The display device according to claim 31, wherein the light diffusing element comprises light scattering fibers.

40. The display device according to claim 26, wherein a pitch of the incident portions of the optical film is smaller than an arranging pitch of pixel portions of the transmission type display and a pitch of the emitting faces of the photoconductor.

41. The display device according to claim 26, wherein an arranging pitch of pixel portions of the transmission type display and a pitch of the emitting faces of the photoconductor are different from each other.

42. The display device according to claim 41, wherein Pa, P1 and P2 represent the arranging pitch of the pixel portions of the transmission type display, a pitch along a plane of pixel portions of the step differentiating faces of the photoconductor, and a pitch of the incident portions of the optical film, respectively, these pitches satisfy:

P1>Pa>P2, and ratios of Pa, P1 and P2 satisfy at least one of:

P1/Pa=1.3 to 1.7, or 2.1 to 2.8, or 3.5 or more;

P1/P2=1.3 to 1.7, or 2.1 to 2.8, or 3.5 or more; and

Pa/P2=1.3 to 1.7, or 2.1 to 2.8, or 3.5 or more.

43. The display device according to claim 41, wherein when Pa, P1 and P2 represent the arranging pitch of the pixel portions of the transmission type display means, a pitch along a plane of pixel portions of the emitting faces of the optical film, and a pitch of the incident portions of the optical film, respectively, these pitches satisfy:

Pa>P1>P2, and ratios of these pitches satisfy at least one of:

Pa/P1=1.3 to 1.7, or 2.1 to 2.8, or 3.5 or more;

P1/P2=1.3 to 1.7, or 2.1 to 2.8, or 3.5 or more; and

Pa/P2=1.3 to 1.7, or 2.1 to 2.8, or 3.5 or more.

44. The display device according to claim 26, wherein the incident portions of the optical film are arranged at a pitch that is not more than an arranging pitch of pixel portions of the transmission type display.

45. The display device according to claim 44, wherein when P2 and Pa represent the pitch of the incident portions of the optical film and the arranging pitch of the pixel portions of the transmission type display, respectively, P2 and Pa are set to be within:

P2=5 to 50 $\mu$m where 10 $\mu$m$\leq$5 Pa$\leq$50 $\mu$m,

P2=20 to 100 $\mu$m where 50 $\mu$m<Pa$\leq$100 $\mu$m,

P2=50 to 300 $\mu$m where 100 $\mu$m<Pa$\leq$300 $\mu$m, and

P2=100 $\mu$m to 500 $\mu$m where Pa>300 $\mu$m, and wherein Pa$\leq$P2.

46. The display device according to claim 45, wherein when R represents a radius of curvature of the refractive face:

R=30 $\mu$m to 50 $\mu$m where 10 $\mu$m$\leq$Pa$\leq$50 $\mu$m,

R=80 $\mu$m to 500 $\mu$m where 50 $\mu$m<Pa$\leq$100 $\mu$m,

R=150 $\mu$m to 800 $\mu$m where 100 $\mu$m<Pa$\leq$300 $\mu$m, and

R=200 $\mu$m to 1500 $\mu$m and R 1.5$\geq$Pa where Pa>300 $\mu$m.

47. The display device according to claim 26, wherein a pitch of the step differentiating faces of the photoconductor and a pitch of the incident portions of the optical film are different from each other.

48. The display device according to claim 26, wherein a pitch of the incident portions of the optical film is smaller than an arranging pitch of pixel portions of the transmission type display.

49. The display device according to claim 26, wherein a length direction of the step differentiating faces of the photoconductor and a length direction of the incident portions of the optical film are obliquely shifted with respect to each other.

50. The display device according to claim 49, wherein the length direction of the incident portions of the optical film is obliquely shifted with respect to an arranging direction of pixel portions of the transmission type display.

51. An illumination panel comprising:

a light source;

a photoconductor including an incident end face that takes in light from the light source, and a front face having emitting faces which are arranged at intervals and oppositely to the incident end face, said emitting faces guiding light incident thereon from the incident end face to be directly emitted as illumination light in a first predetermined direction, and said front face also having reflective faces each of which is arranged between respective adjacent ones of the emitting faces, said reflective faces reflecting external light incident on the front face from outside of the photoconductor; and an optical film arranged on a side of the front face of the photoconductor to emit the illumination light emitted from the emitting faces of the photoconductor in a second predetermined direction which differs from the first predetermined direction, and to emit the external light that is reflected by said reflective faces of the photoconductor in a third predetermined direction which is substantially equal to the second predetermined direction;

wherein the front face of the photoconductor is formed in a stepwise shape and comprises step faces on which the reflective faces are formed, and step differentiating faces which connect respective adjacent ones of the step faces and which emit the light incident from the incident end face, said step differentiating faces constituting the emitting faces; and wherein the optical film comprises a flat front face that emits light in the second predetermined direction, and a back face having at least one projecting incident portion, said at least one projecting incident portion comprising an incident face that takes in the light emitted from the step differentiating faces of the photoconductor and a refractive face that one of reflects and refracts the light that is taken in from the incident face in the third predetermined direction which is substantially equal to the second predetermined direction.

* * * * *